(12) United States Patent
Johnson et al.

(10) Patent No.: US 12,123,334 B2
(45) Date of Patent: Oct. 22, 2024

(54) CONFIGURABLE AFTERTREATMENT SYSTEMS INCLUDING A HOUSING

(71) Applicant: Cummins Emission Solutions Inc., Columbus, IN (US)

(72) Inventors: Ryan M. Johnson, Cottage Grove, WI (US); John G. Buechler, Indianapolis, IN (US); Matthew K. Volmerding, Columbus, IN (US); Randy G. Zoran, McFarland, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/381,116

(22) Filed: Oct. 17, 2023

(65) Prior Publication Data

US 2024/0044272 A1  Feb. 8, 2024

Related U.S. Application Data

(63) Continuation of application No. 17/923,804, filed as application No. PCT/US2021/029282 on Apr. 27, 2021, now Pat. No. 11,828,214.

(Continued)

(51) Int. Cl.
*F01N 3/10* (2006.01)
*F01N 3/021* (2006.01)
(Continued)

(52) U.S. Cl.
CPC ............. *F01N 3/103* (2013.01); *F01N 3/033* (2013.01); *F01N 3/2066* (2013.01); *F01N 3/021* (2013.01);
(Continued)

(58) Field of Classification Search
CPC ........ F01N 3/021; F01N 3/022; F01N 3/0842; F01N 3/029; F01N 3/0293; F01N 3/033;
(Continued)

(56) References Cited

U.S. PATENT DOCUMENTS

| 1,104,963 | A | 7/1914 | Coanda |
| 4,424,777 | A | 1/1984 | Klomp |

(Continued)

FOREIGN PATENT DOCUMENTS

| CN | 101815851 A | 8/2010 |
| CN | 102242662 A | 11/2011 |

(Continued)

OTHER PUBLICATIONS

European Search Report in European Patent Application No. 20897056.6 issued Feb. 27, 2024.

(Continued)

*Primary Examiner* — Binh Q Tran
(74) *Attorney, Agent, or Firm* — Foley & Lardner LLP

(57) ABSTRACT

An aftertreatment system for treating constituents of an exhaust gas includes: a housing defining a first internal volume and a second internal volume; an oxidation catalyst in the first internal volume and extending along a first axis, the oxidation catalyst configured to receive at least a portion of the exhaust gas via an inlet conduit fluidly coupled to the oxidation catalyst; a filter in the first internal volume and extending along a second axis parallel to and offset from the first axis, wherein an outlet of the filter is disposed within the second internal volume and configured to emit the exhaust gas into the second internal volume; at least one selective catalytic reduction (SCR) catalyst in the second internal volume and extending along a third axis that is perpendicular to the first axis; and a decomposition tube in the second internal volume in a direction parallel to the third axis.

11 Claims, 26 Drawing Sheets

Related U.S. Application Data

(60) Provisional application No. 63/022,057, filed on May 8, 2020.

(51) Int. Cl.

| | | |
|---|---|---|
| *F01N 3/029* | (2006.01) | |
| *F01N 3/033* | (2006.01) | |
| *F01N 3/08* | (2006.01) | |
| *F01N 3/20* | (2006.01) | |
| *F01N 13/00* | (2010.01) | |

(52) U.S. Cl.
CPC .......... *F01N 3/0293* (2013.01); *F01N 3/0335* (2013.01); *F01N 3/0814* (2013.01); *F01N 3/0842* (2013.01); *F01N 3/108* (2013.01); *F01N 3/206* (2013.01); *F01N 13/009* (2014.06); *F01N 13/0097* (2014.06); *F01N 13/017* (2014.06); *F01N 2240/20* (2013.01); *F01N 2330/38* (2013.01); *F01N 2610/02* (2013.01); *F01N 2610/102* (2013.01); *F01N 2610/1446* (2013.01); *F01N 2610/1453* (2013.01); *F01N 2900/04* (2013.01); *F01N 2900/14* (2013.01); *F01N 2900/1411* (2013.01); *F01N 2900/1806* (2013.01)

(58) Field of Classification Search
CPC ...... F01N 3/0335; F01N 3/035; F01N 3/0814; F01N 3/0871; F01N 3/0885; F01N 3/10; F01N 3/101; F01N 3/103; F01N 3/105; F01N 3/106; F01N 3/108; F01N 3/206; F01N 3/2066; F01N 3/2073; F01N 3/208; F01N 13/009; F01N 13/0097; F01N 13/017; F01N 2240/20; F01N 2330/38; F01N 2250/12; F01N 2570/14; F01N 2570/18; F01N 2610/00; F01N 2610/01; F01N 2610/02; F01N 2610/03; F01N 2610/04; F01N 2610/05; F01N 2610/06; F01N 2610/102; F01N 2610/1446; F01N 2610/1453; F01N 2900/04; F01N 2900/14; F01N 2900/1402; F01N 2900/1404; F01N 2900/1406; F01N 2900/18; F01N 2900/1806

See application file for complete search history.

(56) References Cited

U.S. PATENT DOCUMENTS

| | | | |
|---|---|---|---|
| 5,679,122 | A | 10/1997 | Moll et al. |
| 7,581,387 | B2 | 9/2009 | Bui et al. |
| 7,793,490 | B2 | 9/2010 | Amon et al. |
| 8,033,101 | B2 | 10/2011 | Amon et al. |
| 8,230,678 | B2 | 7/2012 | Aneja et al. |
| 8,375,708 | B2 | 2/2013 | Forster et al. |
| 8,460,610 | B2 | 6/2013 | Silver et al. |
| 8,607,555 | B2 | 12/2013 | Kaiser et al. |
| 8,615,984 | B2 | 12/2013 | Kornherr et al. |
| 8,789,363 | B2 | 7/2014 | Iverson et al. |
| 9,021,794 | B2 | 5/2015 | Goss et al. |
| 9,133,744 | B2 | 9/2015 | Birkby et al. |
| 9,248,404 | B2 | 2/2016 | Brunel et al. |
| 9,266,075 | B2 | 2/2016 | Chapman et al. |
| 9,267,417 | B2 | 2/2016 | Baldwin et al. |
| D757,919 | S | 5/2016 | Kimura |
| 9,328,640 | B2 | 5/2016 | Iverson et al. |
| 9,346,017 | B2 | 5/2016 | Greber |
| 9,352,276 | B2 | 5/2016 | Sampath |
| 9,453,444 | B2 | 9/2016 | Fischer et al. |
| 9,464,546 | B2 | 10/2016 | Perrot et al. |
| 9,581,067 | B2 | 2/2017 | Guilbaud et al. |
| D781,071 | S | 3/2017 | Callif et al. |
| 9,605,573 | B2 | 3/2017 | Solbrig et al. |
| 9,664,081 | B2 | 5/2017 | Rusch et al. |
| 9,714,598 | B2 | 7/2017 | Alano et al. |
| D794,100 | S | 8/2017 | Mcdonald et al. |
| 9,726,064 | B2 | 8/2017 | Alano |
| 9,737,908 | B2 | 8/2017 | Hornback et al. |
| D809,577 | S | 2/2018 | Mcdonald et al. |
| D816,010 | S | 4/2018 | Rike |
| 9,995,193 | B2 | 6/2018 | Alano et al. |
| 10,024,217 | B1 | 7/2018 | Johnson et al. |
| 10,030,564 | B2 | 7/2018 | Cossard et al. |
| 10,174,658 | B2 | 1/2019 | Dimpelfeld et al. |
| 10,190,465 | B2 | 1/2019 | Alano et al. |
| D840,908 | S | 2/2019 | Rike |
| 10,215,075 | B2 | 2/2019 | Chapman et al. |
| 10,247,081 | B2 | 4/2019 | Niaz |
| 10,273,853 | B2 | 4/2019 | Golin |
| D849,662 | S | 5/2019 | Rike |
| 10,287,948 | B1 | 5/2019 | Moulieres et al. |
| 10,287,954 | B2 | 5/2019 | Chapman et al. |
| 10,294,843 | B2 | 5/2019 | Alano et al. |
| 10,316,721 | B1 | 6/2019 | Moulieres et al. |
| D855,090 | S | 7/2019 | Mcdonald et al. |
| 10,337,379 | B2 | 7/2019 | Dimpelfeld et al. |
| 10,337,380 | B2 | 7/2019 | Willats et al. |
| 10,422,268 | B2 | 9/2019 | Niaz |
| 10,533,478 | B2 | 1/2020 | Alano |
| 10,577,995 | B2 | 3/2020 | Ker et al. |
| 10,612,443 | B2 | 4/2020 | Li et al. |
| 10,632,430 | B1 | 4/2020 | Liu et al. |
| 10,731,536 | B1 | 8/2020 | Chenoweth et al. |
| 10,787,946 | B2 | 9/2020 | Rohde et al. |
| 10,808,587 | B2 | 10/2020 | Ottaviani et al. |
| 10,823,032 | B2 | 11/2020 | Willats et al. |
| 10,907,522 | B2 | 2/2021 | Poinsot et al. |
| 10,914,218 | B1 * | 2/2021 | Chapman .............. F01N 3/2066 |
| 10,920,635 | B2 | 2/2021 | Kozakiewicz |
| 10,920,642 | B2 | 2/2021 | Wang et al. |
| 10,933,387 | B2 | 3/2021 | Cvelbar |
| 10,967,329 | B2 | 4/2021 | Alano et al. |
| 11,085,346 | B2 | 8/2021 | Tucker et al. |
| 11,105,241 | B2 | 8/2021 | Tucker et al. |
| 11,193,412 | B2 | 12/2021 | Cvelbar et al. |
| 11,230,958 | B2 | 1/2022 | Tucker et al. |
| 11,242,788 | B2 | 2/2022 | Kinnaird |
| 11,242,790 | B2 | 2/2022 | Chapman et al. |
| 11,268,424 | B2 | 3/2022 | Kimura et al. |
| 11,300,028 | B2 | 4/2022 | Meunier |
| 11,313,266 | B2 | 4/2022 | Tucker et al. |
| 11,369,910 | B2 | 6/2022 | Holzmann et al. |
| 11,428,140 | B1 | 8/2022 | Kinnaird et al. |
| 11,459,927 | B2 | 10/2022 | Rajashekharaiah et al. |
| 11,459,929 | B2 | 10/2022 | Dimpelfeld et al. |
| 11,506,101 | B2 | 11/2022 | Levato et al. |
| 11,591,943 | B2 * | 2/2023 | Hornback ............... F01N 3/106 |
| 11,746,684 | B2 | 9/2023 | Wahlstrom |
| 11,761,365 | B2 | 9/2023 | Liu et al. |
| 2004/0112883 | A1 | 6/2004 | Bowden et al. |
| 2004/0237511 | A1 | 12/2004 | Ripper et al. |
| 2005/0172615 | A1 | 8/2005 | Mahr |
| 2005/0262843 | A1 | 12/2005 | Monty |
| 2006/0150614 | A1 | 7/2006 | Cummings |
| 2006/0153748 | A1 | 7/2006 | Huthwohl et al. |
| 2006/0191254 | A1 | 8/2006 | Bui et al. |
| 2006/0260104 | A1 | 11/2006 | Himi |
| 2006/0283181 | A1 | 12/2006 | Crawley et al. |
| 2007/0144126 | A1 | 6/2007 | Ohya et al. |
| 2007/0163241 | A1 | 7/2007 | Meingast et al. |
| 2007/0245718 | A1 | 10/2007 | Cheng et al. |
| 2007/0283683 | A1 | 12/2007 | Bellinger |
| 2008/0083200 | A1 | 4/2008 | Gruber et al. |
| 2008/0087013 | A1 | 4/2008 | Crawley et al. |
| 2008/0121179 | A1 | 5/2008 | Park et al. |
| 2008/0127635 | A1 | 6/2008 | Hirata et al. |
| 2008/0314033 | A1 * | 12/2008 | Aneja ..................... F01N 3/033 60/299 |
| 2009/0000283 | A1 | 1/2009 | Endicott et al. |
| 2009/0019843 | A1 | 1/2009 | Levin et al. |
| 2009/0031717 | A1 | 2/2009 | Blaisdell |

(56) References Cited

U.S. PATENT DOCUMENTS

| | | |
|---|---|---|
| 2009/0049829 A1 | 2/2009 | Kaiser et al. |
| 2009/0084094 A1 | 4/2009 | Goss et al. |
| 2009/0145119 A1 | 6/2009 | Farrell et al. |
| 2009/0158717 A1 | 6/2009 | Kimura et al. |
| 2009/0158722 A1 | 6/2009 | Kojima et al. |
| 2009/0180937 A1 | 7/2009 | Nohl et al. |
| 2009/0229254 A1 | 9/2009 | Gibson |
| 2010/0083641 A1 | 4/2010 | Makartchouk et al. |
| 2010/0146942 A1 | 6/2010 | Mayr et al. |
| 2010/0146948 A1 | 6/2010 | Dacosta et al. |
| 2010/0187383 A1 | 7/2010 | Olsen et al. |
| 2010/0229513 A1 | 9/2010 | Eisengraeber-Pabst et al. |
| 2010/0251719 A1 | 10/2010 | Mancini et al. |
| 2010/0319329 A1 | 12/2010 | Khadiya |
| 2011/0005232 A1 | 1/2011 | Williams et al. |
| 2011/0079003 A1 | 4/2011 | Sun et al. |
| 2011/0094206 A1 | 4/2011 | Liu et al. |
| 2011/0099978 A1 | 5/2011 | Davidson et al. |
| 2011/0146237 A1 | 6/2011 | Adelmann et al. |
| 2011/0194987 A1 | 8/2011 | Hodgson et al. |
| 2012/0003955 A1 | 1/2012 | Gabriel |
| 2012/0124983 A1 | 5/2012 | Hong |
| 2012/0204541 A1 | 8/2012 | Li et al. |
| 2012/0204542 A1 | 8/2012 | Norris et al. |
| 2012/0204544 A1 | 8/2012 | Uhrich et al. |
| 2012/0216513 A1 | 8/2012 | Greber et al. |
| 2013/0067891 A1 | 3/2013 | Hittle et al. |
| 2013/0097819 A1 | 4/2013 | Kojima |
| 2013/0333363 A1 | 12/2013 | Joshi et al. |
| 2014/0033686 A1 | 2/2014 | Fischer et al. |
| 2014/0193318 A1 | 7/2014 | Davidson et al. |
| 2014/0230418 A1 | 8/2014 | Perrot et al. |
| 2014/0260209 A1 | 9/2014 | Goss et al. |
| 2014/0325967 A1 | 11/2014 | Kimura |
| 2014/0373721 A1 | 12/2014 | Sandou et al. |
| 2015/0000389 A1 | 1/2015 | Runde et al. |
| 2015/0016214 A1 | 1/2015 | Mueller |
| 2015/0089923 A1 | 4/2015 | Henderson et al. |
| 2015/0110681 A1 | 4/2015 | Ferront et al. |
| 2015/0121855 A1 | 5/2015 | Munnannur et al. |
| 2015/0204227 A1* | 7/2015 | Eager ............... F02D 41/405 60/274 |
| 2015/0218996 A1 | 8/2015 | Brandl et al. |
| 2015/0224870 A1 | 8/2015 | Shin et al. |
| 2015/0360176 A1 | 12/2015 | Bui et al. |
| 2016/0031124 A1 | 2/2016 | Van Dyck |
| 2016/0061090 A1* | 3/2016 | Anand ............... F01N 3/2066 60/297 |
| 2016/0069239 A1 | 3/2016 | Freeman et al. |
| 2016/0083060 A1 | 3/2016 | Kassianoff |
| 2016/0090887 A1 | 3/2016 | Mitchell et al. |
| 2016/0115847 A1 | 4/2016 | Chapman et al. |
| 2016/0138454 A1 | 5/2016 | Alano et al. |
| 2016/0158714 A1 | 6/2016 | Li et al. |
| 2016/0175784 A1 | 6/2016 | Harmon et al. |
| 2016/0194991 A1* | 7/2016 | Clayton, Jr. ......... B01D 53/944 422/169 |
| 2016/0243510 A1 | 8/2016 | Denton et al. |
| 2016/0251990 A1 | 9/2016 | Dimpelfeld et al. |
| 2016/0326931 A1 | 11/2016 | Freeman et al. |
| 2016/0332126 A1 | 11/2016 | Nande et al. |
| 2016/0361694 A1 | 12/2016 | Brandl et al. |
| 2017/0067387 A1 | 3/2017 | Khaled |
| 2017/0089246 A1 | 3/2017 | Greber et al. |
| 2017/0107882 A1 | 4/2017 | Chiruta et al. |
| 2017/0152778 A1 | 6/2017 | Li et al. |
| 2017/0327273 A1 | 11/2017 | Lee et al. |
| 2017/0361273 A1* | 12/2017 | Zoran ............... B01D 53/944 |
| 2017/0370262 A1 | 12/2017 | Zoran et al. |
| 2018/0078912 A1 | 3/2018 | Yadav et al. |
| 2018/0087428 A1 | 3/2018 | Barr |
| 2018/0142604 A1 | 5/2018 | Niaz |
| 2018/0266300 A1 | 9/2018 | Liu et al. |
| 2018/0306083 A1 | 10/2018 | Sampath et al. |
| 2018/0313247 A1 | 11/2018 | Bauknecht et al. |
| 2019/0063294 A1 | 2/2019 | Johnson et al. |
| 2020/0102873 A1 | 4/2020 | Ramolivo et al. |
| 2020/0123955 A1 | 4/2020 | Liu et al. |
| 2020/0325811 A1 | 10/2020 | Levin et al. |
| 2020/0332696 A1 | 10/2020 | Chapman et al. |
| 2021/0039056 A1 | 2/2021 | De Rudder et al. |
| 2021/0095587 A1 | 4/2021 | Cvelbar et al. |
| 2021/0199039 A1* | 7/2021 | Panunzio ......... B01D 53/9477 |
| 2021/0301704 A1 | 9/2021 | Hornback |
| 2021/0301710 A1 | 9/2021 | Cvelbar et al. |
| 2021/0363907 A1 | 11/2021 | Poinsot et al. |
| 2021/0404367 A1 | 12/2021 | Alano et al. |
| 2022/0065148 A1 | 3/2022 | Sudries et al. |
| 2022/0090532 A1 | 3/2022 | Degner et al. |
| 2022/0099121 A1 | 3/2022 | Kumar |
| 2022/0162975 A1 | 5/2022 | Cvelbar et al. |
| 2022/0162976 A1 | 5/2022 | Alano et al. |
| 2022/0178296 A1 | 6/2022 | Hogan |
| 2022/0184567 A1 | 6/2022 | Geant |
| 2022/0316382 A1 | 10/2022 | De Rudder |
| 2022/0349330 A1 | 11/2022 | Chapman et al. |
| 2022/0379272 A1 | 12/2022 | Alano |
| 2023/0003159 A1 | 1/2023 | Mittapalli et al. |
| 2023/0141549 A1 | 5/2023 | Kalyanshetti |

FOREIGN PATENT DOCUMENTS

| | | |
|---|---|---|
| CN | 103429864 A | 12/2013 |
| CN | 105143628 A | 12/2015 |
| CN | 205559030 U | 9/2016 |
| CN | 106377919 A | 2/2017 |
| CN | 206144632 U | 5/2017 |
| CN | 206144633 U | 5/2017 |
| CN | 106968765 A | 7/2017 |
| CN | 107435576 A | 12/2017 |
| CN | 108194176 A | 6/2018 |
| CN | 108708781 A | 10/2018 |
| CN | 109477413 A | 3/2019 |
| CN | 208982145 U | 6/2019 |
| CN | 106014560 B | 7/2019 |
| CN | 209179849 A | 7/2019 |
| CN | 209855888 U | 12/2019 |
| CN | 110761876 A | 2/2020 |
| CN | 210195855 U | 3/2020 |
| CN | 210686097 U | 6/2020 |
| CN | 210858906 U | 6/2020 |
| CN | 211082028 U | 7/2020 |
| CN | 211116205 U | 7/2020 |
| CN | 211573625 U | 9/2020 |
| CN | 111810276 A | 10/2020 |
| CN | 212130586 U | 12/2020 |
| CN | 212130587 U | 12/2020 |
| CN | 212296579 U | 1/2021 |
| CN | 112483224 A | 3/2021 |
| CN | 212744129 U | 3/2021 |
| CN | 214304014 U | 9/2021 |
| CN | 214836650 U | 11/2021 |
| CN | 214887318 U | 11/2021 |
| CN | 215109110 U | 12/2021 |
| CN | 215719044 U | 2/2022 |
| CN | 215719045 U | 2/2022 |
| CN | 216157745 U | 4/2022 |
| CN | 216617626 U | 5/2022 |
| CN | 217782989 U | 11/2022 |
| DE | 10021166 A1 | 11/2001 |
| DE | 10312212 | 11/2003 |
| DE | 10 2004 043 931 | 3/2006 |
| DE | 10 2010 014 037 A1 | 11/2010 |
| DE | 11 2009 000 650 T5 | 1/2011 |
| DE | 11 2010 002 589 T5 | 11/2012 |
| DE | 10 2014 101 889 A1 | 8/2015 |
| DE | 10 2014 102 798 A1 | 9/2015 |
| DE | 10 2016 222 743 A1 | 5/2017 |
| DE | 10 2016 115 030 A1 | 2/2018 |
| DE | 10 2018 127 387 A1 | 5/2019 |
| DE | 10 2007 051 510 B4 | 2/2021 |
| DE | 10 2020 121 659 A1 | 3/2021 |
| EP | 0 716 918 A2 | 6/1996 |
| EP | 1 716 917 A1 | 11/2006 |

(56) References Cited

FOREIGN PATENT DOCUMENTS

| | | |
|---|---|---|
| EP | 2 151 560 B1 | 2/2010 |
| EP | 2 769 762 A1 | 8/2014 |
| EP | 2 551 482 B1 | 1/2015 |
| EP | 2 546 488 B1 | 4/2015 |
| EP | 2 551 481 B1 | 8/2015 |
| EP | 3 085 913 A1 | 10/2016 |
| EP | 3 085 915 A1 | 10/2016 |
| EP | 3 085 916 A1 | 10/2016 |
| EP | 3 102 802 A1 | 12/2016 |
| EP | 2 570 178 B1 | 4/2017 |
| EP | 2 522 822 B1 | 6/2017 |
| EP | 2 796 684 B1 | 1/2018 |
| EP | 3 425 180 A1 | 1/2019 |
| FR | 2965011 A1 | 3/2012 |
| FR | 3010134 A1 | 3/2015 |
| FR | 2984953 B1 | 4/2015 |
| FR | 2977913 B1 | 6/2015 |
| FR | 3020835 A1 | 11/2015 |
| FR | 3020834 B1 | 6/2016 |
| FR | 3020835 B1 | 6/2016 |
| FR | 3098854 B1 | 7/2021 |
| FR | 3097775 B1 | 5/2022 |
| FR | 3102683 B1 | 6/2022 |
| FR | 3111664 B1 | 7/2022 |
| FR | 3110634 B1 | 9/2022 |
| GB | 2 385 545 A | 8/2003 |
| IN | 201921025624 A | 1/2021 |
| JP | 2003-056274 A | 2/2003 |
| JP | 2009-156077 A | 7/2009 |
| JP | 2010-180863 A | 8/2010 |
| JP | 2013-133774 A | 7/2013 |
| WO | WO-2009/024815 A2 | 2/2009 |
| WO | WO-2009/024815 A3 | 2/2009 |
| WO | WO-2010/146285 A1 | 12/2010 |
| WO | WO-2011/110885 A1 | 9/2011 |
| WO | WO-2012/110720 A1 | 8/2012 |
| WO | WO-2012/123660 A1 | 9/2012 |
| WO | WO-2015/119617 A1 | 8/2015 |
| WO | WO-2018/017164 A1 | 1/2018 |
| WO | WO-2018/075061 A1 | 4/2018 |
| WO | WO-2018/226626 A1 | 12/2018 |
| WO | WO-2019/029880 A1 | 2/2019 |
| WO | WO-2019/143373 A1 | 7/2019 |
| WO | WO-2020/009713 A1 | 1/2020 |
| WO | WO-2021/050819 A1 | 3/2021 |
| WO | WO-2021/112826 A1 | 6/2021 |
| WO | WO-2021/113246 A1 | 6/2021 |
| WO | WO-2021/173357 A1 | 9/2021 |
| WO | WO-2021/225824 | 11/2021 |

OTHER PUBLICATIONS

Office Action in German Patent Application No. 11 2021 005 606.9 issued Dec. 14, 2023.
International Search Report and Written Opinion in PCT Application No. PCT/US2020/050318 issued Dec. 8, 2020.
Non-Final Office Action in U.S. Appl. No. 29/835,755 issued Oct. 4, 2023.
Non-Final Office Action in U.S. Appl. No. 29/835,777 issued Oct. 4, 2023.
Office Action in Chinese Patent Application No. 202180064965.5 issued Sep. 13, 2023.
Coanda effect, https://en.wikipedia.org/w/index.php?title=Coand%C4%83_effect&oldid=1000333406 (last visited Mar. 12, 2021).
Combined Search and Examination Report issued for GB2205057.9, dated May 5, 2022, 6 pages.
Examination Report for U.K. Patent App. No. 1413056.1 dated Sep. 21, 2017, 5 pages.
Examination Report issued for UK Patent Application No. GB 1917608.0 issued Sep. 6, 2021, 3 pages.
Final Office Action on U.S. Appl. No. 17/695,580 DTD Feb. 6, 2023.
Final US Office Action issued for U.S. Appl. No. 13/837,446 issued Jan. 5, 2015, 25 pages.
First Examination Report for Indian Patent Application No. 201947050068, issued Jan. 13, 2021.
First Examination Report on IN 202247030005, DTD Jul. 13, 2022.
First Examination Report on IN 202247032735, DTD Jul. 22, 2022.
First Examination Report on IN Application No. 202147057999, dated Mar. 14, 2022.
First Office Action issued for Chinese Patent Application No. 201880001223.6, issued Dec. 17, 2020, 9 pages.
Foreign Action other than Search Report on PCT DTD Nov. 17, 2022.
Foreign Action other than Search Report on PCT PCT/US2020/062718 DTD Jun. 16, 2022.
Foreign Office Action on DE 102014002750.3, DTD Jan. 24, 2022.
G. Comes, "Theoretical Modeling, Design and Simulation of an Innovative Diverting Valve Based on Coanda Effect", Fluids 2018, 3, 103, (2018).
International Search Report & Written Opinion for PCT/US2012/022582 dated Oct. 25, 2012, 6 pages.
International Search Report and Written Opinion for International Patent Application No. PCT/US2020/062718 DTD Feb. 19, 2021.
International Search Report and Written Opinion for PCT App. No. PCT/IB2019/054988 dated Jan. 29, 2020, 12 pages.
International Search Report and Written Opinion issued for PCT Application No. PCT/US2021/017551 issued Apr. 28, 2021,8 pages.
International Search Report and Written Opinion issued for PCT Application No. PCT/US2021/056073, issued Jan. 26, 2022, 15 pages.
International Search Report and Written Opinion issued for PCT/US2022/014781 issued Apr. 25, 2022, 14 pages.
International Search Report and Writtin Opinion issued for PCT Application No. PCT/US2021/029282 issued Jul. 27, 2021, 9 pages.
International Search Report from corresponding PCT Application No. PCT/US2018/035959, dated Oct. 19, 2018, pp. 1-4.
Non-Final Office Action on U.S. Appl. No. 15/657,941 DTD Aug. 6, 2019.
Non-Final Office Action on U.S. Appl. No. 16/618,716 DTD Feb. 23, 2021.
Non-Final Office Action on U.S. Appl. No. 17/400,567 DTD May 23, 2022.
Non-Final Office Action on U.S. Appl. No. 17/695,580 DTD Jul. 27, 2022.
Non-Final Office Action on U.S. Appl. No. 17/923,804 DTD Mar. 16, 2023.
Notice of Allowance on U.S. Appl. No. 17/923,804 DTD Jul. 19, 2023.
Office Action issued for German Patent Application No. DE 11 2012 005 741.4 issued Dec. 7, 2022, 9 pages, included translation.
Preliminary Office Action on BR1120190253246, dated Apr. 26, 2022 (4 pages).
Search and Examination Report issued on GB2116026.2 issued Dec. 20, 2021, 3 pages.
Search Report and Written Opinion issued for PCT Application No. PCT/US2019/064232 issued Feb. 12, 2020, 13 pages.
Search Report issued for UK Patent Application No. GB 2101393.3, issued Feb. 22, 2021, 2 pages.
Search Report Letter issued for UK Patent Application No. GB 2101393.3, issued Feb. 22, 2021, 2 pages.
US Office Action issue for U.S. Appl. No. 13/837,446 issued Aug. 29, 2014, 29 pages.
US Office Action on U.S. Appl. No. 14/372,810 DTD Mar. 8, 2017.
US Office Action on U.S. Appl. No. 14/372,810 DTD May 25, 2016.
Written Opinion from corresponding PCT Application No. PCT/US2018/035959, dated Oct. 19, 2018, pp. 1-8.

* cited by examiner

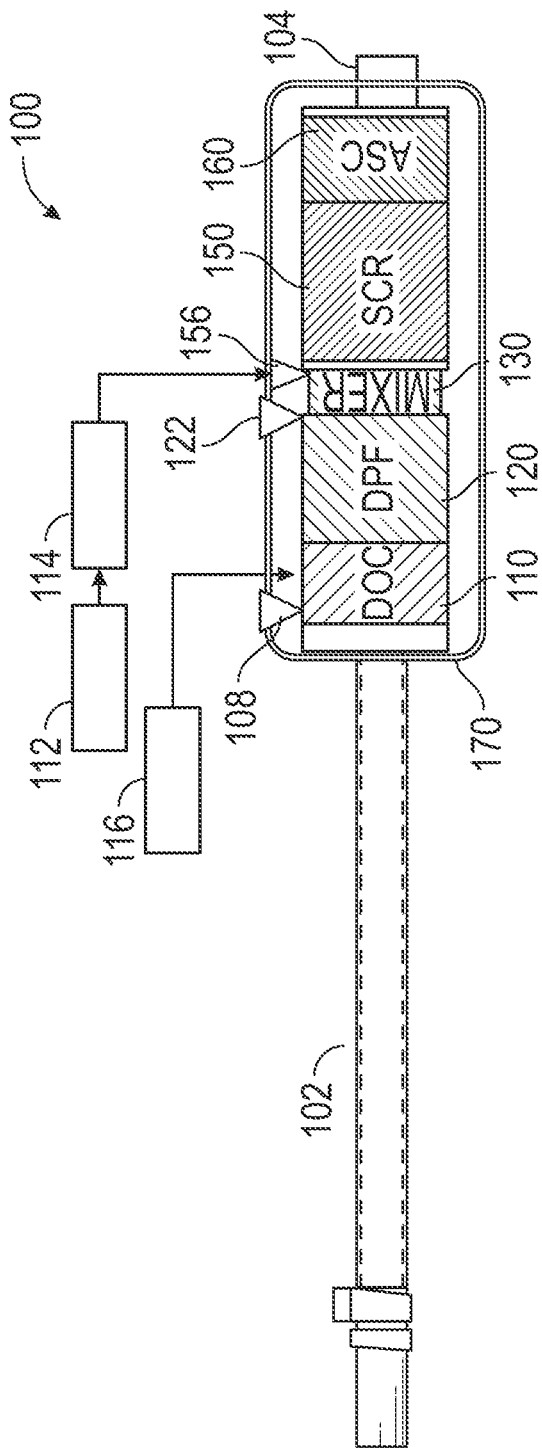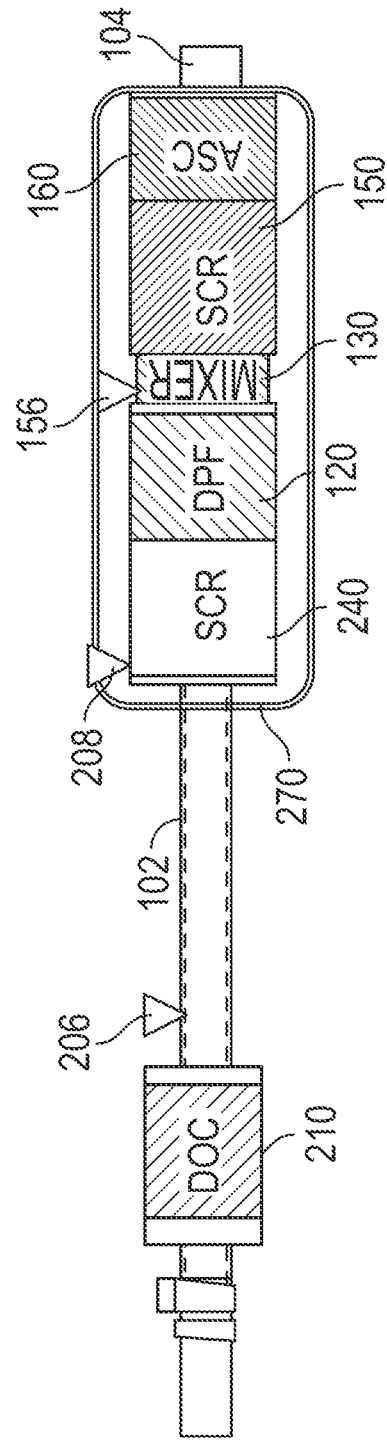
FIG. 1
FIG. 2

CONFIGURABLE AFTERTREATMENT SYSTEMS INCLUDING A HOUSING

CROSS-REFERENCE TO RELATED APPLICATIONS

The present application is a continuation of U.S. patent application Ser. No. 17/923,804, filed Nov. 7, 2022, which is a national stage of PCT Application No. PCT/US2021/029282, filed Apr. 27, 2021, which claims the benefit of U.S. Provisional Application No. 63/022,057, filed May 8, 2020. The contents of these applications are incorporated herein by reference in their entireties.

TECHNICAL FIELD

The present disclosure relates generally to aftertreatment systems for treating constituents of an exhaust gas produced by the engine.

BACKGROUND

Exhaust aftertreatment systems are used to receive and treat exhaust gas generated by internal combustion engines. Generally exhaust gas aftertreatment systems include any of several different components to reduce the levels of harmful exhaust emissions present in the exhaust gas. For example, certain exhaust gas aftertreatment systems for diesel-powered internal combustion engines include a selective catalytic reduction (SCR) system including a catalyst formulated to convert $NO_x$ (NO and $NO_2$ in some fraction) into harmless nitrogen gas ($N_2$) and water vapor ($H_2O$) in the presence of ammonia ($NH_3$). Generally in such aftertreatment systems, an exhaust reductant, (e.g., a diesel exhaust fluid such as urea) is injected into the SCR system to provide a source of ammonia, and mixed with the exhaust gas to partially reduce the $NO_x$ gases. The reduction byproducts of the exhaust gas are then fluidly communicated to the catalyst included in the SCR system to decompose substantially all of the $NO_x$ gases into relatively harmless byproducts, which are expelled out of the aftertreatment system. Mounting of aftertreatment systems that include various components on structures such as vehicle chassis is dictated by the amount of space available. Specifically, increasing emission regulations have made it challenging to incorporate a plurality of aftertreatment components in limited space available on mounting structures.

SUMMARY

Embodiments described herein relate generally to aftertreatment systems and architectures that include a housing within which the various aftertreatment components of the aftertreatment system are disposed. In particular, various embodiments of the aftertreatment system described herein include a housing defining two or more internal volumes that are fluidly isolated from each other. A plurality of aftertreatment legs are disposed within the housing, each leg including one or more aftertreatment components. Exhaust gas is emitted by at least one of the aftertreatment legs into one of the fluidly isolated internal volumes before being transmitted to a downstream aftertreatment leg.

In some embodiments, an aftertreatment system for treating constituents of an exhaust gas, comprises: a housing defining at least a first internal volume and a second internal volume that is fluidly isolated from the first internal volume; a first aftertreatment leg extending from the first internal volume to the second internal volume, the first aftertreatment leg comprising: a temperature control aftertreatment component extending along a first axis and configured to receive at least a portion of the exhaust gas via an inlet conduit fluidly coupled to the temperature control aftertreatment component, and an oxidation catalyst disposed downstream of the temperature control aftertreatment component and axially aligned with the temperature control aftertreatment component, an outlet of the oxidation catalyst being disposed in the second internal volume; a second aftertreatment leg extending from the second internal volume to the first internal volume, the second aftertreatment leg comprising: a filter extending along a second axis that is offset from the first axis, the filter configured to receive the exhaust gas from the oxidation catalyst through the second internal volume, an outlet of the filter disposed within the first internal volume and configured to emit exhaust gas into the first internal volume after passing through the filter; a third aftertreatment leg extending from the first internal volume to the second internal volume, the third aftertreatment leg comprising: at least one selective catalytic reduction (SCR) catalyst disposed in at least the first internal volume and extending along a SCR axis that is offset from the first axis and the second axis, an inlet of the at least one SCR catalyst being disposed in the second internal volume; a decomposition tube extending from the first internal volume to the second internal volume along an axis that is offset from each of the first and second axis, an inlet of the decomposition tube being disposed in the first internal volume such that the decomposition tube is configured to receive the exhaust gas emitted into the first internal volume, and to communicate the exhaust gas from the first internal volume to the inlet of the at least one SCR catalyst in the second internal volume; and a reductant injection inlet proximate to the inlet of the decomposition tube and configured to allow reductant to be injected into the decomposition tube.

In some embodiments, the inlet of the decomposition tube is oriented at an angle that is perpendicular to the axis of the decomposition tube and located proximate to the outlet of the filter.

In some embodiments, the inlet of the decomposition tube comprises: a flat end face on which the reductant injector is mounted; and a plurality of pores defined through a wall of the decomposition tube at the inlet of the decomposition tube and configured to allow the exhaust gas to enter the decomposition tube.

In some embodiments, the at least one SCR catalyst comprises: a first SCR catalyst extending along a first SCR axis, and a second SCR catalyst extending along a second SCR axis that is parallel to and offset from the first SCR axis, and the aftertreatment system further comprises a SCR inlet plenum disposed in the first internal volume and fluidly coupled to respective inlets of the first and second SCR catalysts, an outlet of the decomposition tube is fluidly coupled to the SCR inlet plenum, and the SCR inlet plenum is configured to redirect exhaust gas flowing therein towards respective inlets of the first and second SCR catalysts.

In some embodiments, an SCR outlet plenum is disposed in the second internal volume and coupled to respective outlets of the first and second SCR catalysts, the SCR outlet plenum defining an outlet conduit that extends through a sidewall of the housing.

In some embodiments, the at least one SCR catalyst comprises: a first SCR catalyst extending along a first SCR axis, and a second SCR catalyst extending along a second SCR axis that is parallel to and offset from the first SCR axis, wherein a first linear distance from the first axis to the first SCR axis is substantially equal to a second linear distance from the first axis to the second SCR axis, the aftertreatment system further comprises a SCR inlet plenum disposed in the first internal volume and fluidly coupled to each of the first and second SCR catalysts, a linear distance from the first axis to the axis of the decomposition tube is greater than the first linear distance and the second linear distance, and the outlet of the decomposition tube is fluidly coupled to the SCR inlet plenum.

In some embodiments, the aftertreatment system further comprises: an SCR outlet plenum disposed in the second internal volume and fluidly coupled to respective outlets of each of the first and second SCR catalysts, the SCR outlet plenum having an outlet that is fluidly coupled to the first internal volume and configured to emit treated exhaust gas into the first internal volume; and an outlet conduit coupled to a sidewall of the housing forming the first internal volume and configured to expel the treated exhaust gas into the environment.

In some embodiments, a groove is defined in a sidewall of the SCR outlet plenum that is perpendicular to the first and second SCR axes, a portion of the inlet of the decomposition tube being disposed in the groove.

In some embodiments, the at least one SCR catalyst comprises: a first SCR catalyst extending along a first SCR axis, a second SCR catalyst extending along a second SCR axis that is parallel to and offset from the first SCR axis, and a third SCR catalyst extending along a third SCR axis that is parallel to and offset from the first SCR axis and the second SCR axis, and the aftertreatment system further comprises a SCR inlet plenum disposed in the first internal volume and fluidly coupled to each of the first, second, and third SCR catalysts, the decomposition tube is disposed proximate to a central portion of the housing, and the outlet of the decomposition tube being fluidly coupled to the SCR inlet plenum.

In some embodiments, the aftertreatment system further comprises: an SCR outlet plenum disposed in the second internal volume and coupled to respective outlets of each of the first, second, and third SCR catalysts, the SCR outlet plenum having an outlet that is fluidly coupled to the first internal volume and configured to release treated exhaust gas into the first internal volume; and an outlet conduit coupled to a sidewall of the housing forming the first internal volume and configured to expel the treated exhaust gas into the environment In some embodiments, the oxidation catalyst is a first oxidation catalyst and the filter is a first filter, and the first aftertreatment leg further comprises: a second oxidation catalyst extending along a second axis that is parallel to the first axis, a first aftertreatment leg inlet plenum disposed in the first internal volume, the first aftertreatment leg inlet plenum coupled to an inlet of each of the first oxidation catalyst, the second oxidation catalyst, and the inlet conduit, the first aftertreatment leg inlet plenum configured to communicate a first portion of the exhaust gas to the first oxidation catalyst and a second portion of the exhaust gas to the second oxidation catalyst, and a second filter disposed downstream of the second oxidation catalyst and axially aligned with the second oxidation catalyst, an outlet of the second filter disposed in the second internal volume, wherein: the first filter is configured to emit the first portion of the exhaust gas and the second filter is configured to emit the second portion of the exhaust gas into the second internal volume, respectively, and the decomposition tube is configured to receive each of the first portion and the second portion of the exhaust gas.

In some embodiments, the at least one SCR catalyst comprises: a first SCR catalyst extending along a first SCR axis, and a second SCR catalyst extending along a second SCR axis that is parallel to and offset from the first SCR axis, the first SCR axis is parallel to and offset from the first axis, and the second SCR axis is parallel to and offset from the second axis.

In some embodiments, the aftertreatment system further comprises: a SCR inlet plenum disposed in the first internal volume and fluidly coupled to respective inlets of each of the first and second SCR catalysts, the SCR inlet plenum configured to redirect exhaust gas flowing therein towards respective inlets of each of the first and second SCR catalysts, wherein the decomposition tube is disposed proximate to a central portion of the housing such that the decomposition tube is surrounded by the first aftertreatment leg and the second aftertreatment leg, the outlet of the decomposition tube being fluidly coupled to the SCR inlet plenum.

In some embodiments, the aftertreatment system further comprises: an SCR outlet plenum disposed in the second internal volume and coupled to respective outlets of each of the first and second SCR catalysts, the SCR outlet plenum having an outlet that is fluidly coupled to the first internal volume and configured to release treated exhaust gas into the first internal volume; and an outlet conduit coupled to a sidewall of the housing forming the first internal volume and configured to expel the treated exhaust gas into the environment.

In some embodiments, the inlet conduit comprises an inlet cone that has a constantly expanding cross-section from an upstream end to a downstream end thereof, the downstream end coupled to the first aftertreatment leg.

In some embodiments, an aftertreatment system for treating constituents of an exhaust gas, comprises: a housing defining at least a first internal volume and a second internal volume that is fluidly isolated from the first internal volume; a first aftertreatment leg extending from the first internal volume to the second internal volume, the first aftertreatment leg comprising: a temperature control aftertreatment component extending along a first axis and configured to receive at least a portion of the exhaust gas via an inlet conduit fluidly coupled to the temperature control aftertreatment component, and an oxidation catalyst disposed downstream of the temperature control aftertreatment component and axially aligned with the temperature control aftertreatment component, an outlet of the oxidation catalyst being disposed in the second internal volume; a second aftertreatment leg extending from the second internal volume to the first internal volume parallel to the first aftertreatment leg, the second aftertreatment leg comprising: a filter configured to receive the exhaust gas from the oxidation catalyst through the second internal volume, an outlet of the filter disposed within the first internal volume and configured to emit exhaust gas into the first internal volume after passing through the filter; a third aftertreatment leg extending from the first internal volume to the second internal volume, the third aftertreatment leg comprising: at least one SCR catalyst disposed in at least the first internal volume and extending along a SCR axis that is parallel to and offset from the first axis, an inlet of the at least one SCR catalyst being disposed in the second internal volume; a decomposition tube extending from the first internal volume to the second internal volume along an axis that is parallel to and offset from each of the first and second axis, an inlet of the decomposition tube being disposed in the first internal volume such that the decomposition tube is configured to receive the exhaust gas emitted into the first internal volume, and to communicate the exhaust gas from the first internal volume to the inlet of the at least one SCR catalyst in the second internal volume; and a reductant injection inlet proximate to the inlet of the decomposition tube and configured to allow reductant to be injected into the decomposition tube.

In some embodiments, the at least one SCR catalyst comprises: a first SCR catalyst extending along a first SCR axis, and a second SCR catalyst extending along a second SCR axis that is parallel to and offset from the first SCR axis, the first SCR axis is parallel to the first axis, and the second SCR axis is parallel to the second axis.

In some embodiments, the aftertreatment system further comprises: a SCR inlet plenum disposed in the second internal volume and fluidly coupled to each of the first and second SCR catalysts, the SCR inlet plenum configured to redirect exhaust gas flowing therein towards respective inlets of each of the first and second SCR catalysts, wherein the decomposition tube is disposed proximate to a central portion of the housing such that the decomposition tube is surrounded by the first aftertreatment leg and the second aftertreatment leg, the outlet of the decomposition tube being fluidly coupled to the SCR inlet plenum.

In some embodiments, the temperature control aftertreatment component comprises a Vanadium SCR catalyst.

In some embodiments, the aftertreatment system further comprises a hydrocarbon injector disposed on the first aftertreatment leg and configured to insert hydrocarbons into the exhaust gas downstream of the temperature control aftertreatment component and upstream of the oxidation catalyst.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 1 is a schematic illustration of an aftertreatment system, according to an embodiment.

FIG. 2 is a schematic illustration of an aftertreatment system, according to another embodiment.

Figure 3:
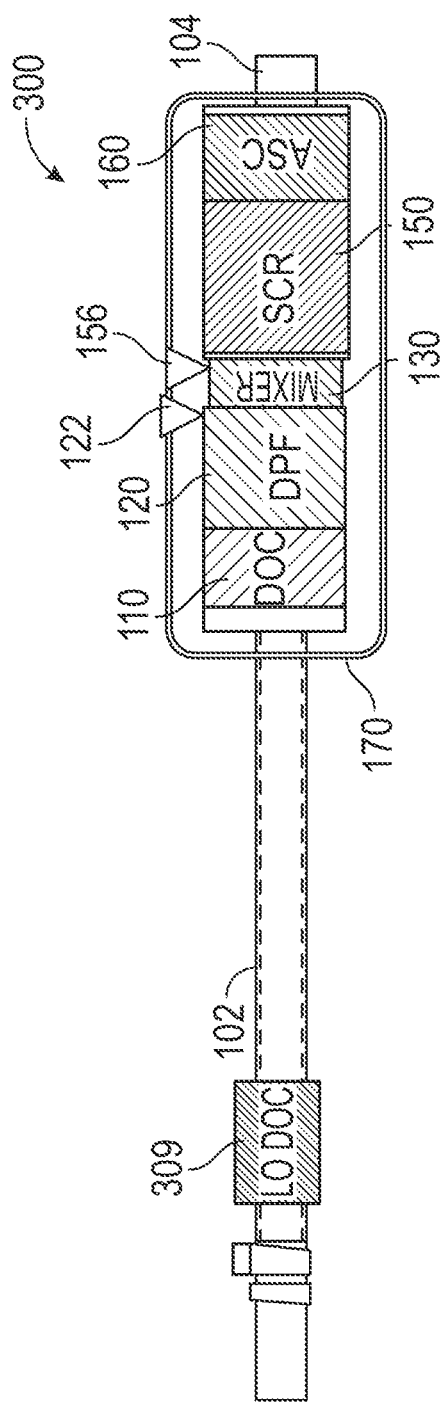
FIG. 3 is a schematic illustration of an aftertreatment system, according to still another embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to aftertreatment systems and architectures that include a housing within which the various aftertreatment components of the aftertreatment system are disposed. In particular, various embodiments of the aftertreatment system described herein include a housing defining two or more internal volumes that are fluidly isolated from each other. A plurality of aftertreatment legs are disposed within the housing, each leg including one or more aftertreatment components. Exhaust gas is emitted by at least one of the aftertreatment legs into one of the fluidly isolated internal volumes before being transmitted to a downstream aftertreatment leg.

Various embodiments of the aftertreatment systems described herein may provide one or more benefits including, for example: 1) allowing packaging of a plurality of aftertreatment components into a compact space within a housing reducing space required for mounting the aftertreatment system; 2) allowing for increased catalyst frontal area while supporting various architectures; 3) providing configurable legs or sections in the main flow path allowing for packing various aftertreatment components or subcomponents; and 4) meeting emission regulations while meeting space demands.

It should be appreciated that various outer surfaces are shown as being transparent in the figures, this is solely to allow the internal components of the system to be seen. The outer surfaces may be opaque, translucent, transparent, or a combination thereof.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine, a gasoline engine, a natural gas engine, a biodiesel engine, a dual fuel engine, an alcohol engine, an E85 or any other suitable internal combustion engine) and decompose constituents of the exhaust gas such as, for example, $NO_x$ gases, CO, etc. The aftertreatment system 100 includes a housing 170 within which an oxidation catalyst 110, a filter 120, a mixer 130, a SCR catalyst 150, and an ammonia oxidation catalyst 160 are disposed. The aftertreatment system 100 may also include a reductant storage tank 112, a reductant insertion assembly 114, and a hydrocarbon insertion assembly 116.

The housing 170 is configured to house each of the components of the aftertreatment system 100. The housing 170 may be formed from a rigid, heat-resistant and corrosion-resistant material, for example stainless steel, iron, aluminum, metals, ceramics, or any other suitable material. The housing 170 may have any suitable cross-section, for example, circular, square, rectangular, oval, elliptical, polygonal, or any other suitable shape. In various embodiments, the housing 170 may be divided into at least a first internal volume and a second internal volume that are fluidly isolated from each other. The various components of the aftertreatment system 100 may extend across the first and second internal volumes and may release exhaust gas into or uptake exhaust gas from one of the first or second internal volumes. The various components may be disposed in a horizontal, vertical, or any other orientation within the housing 170 and may be oriented parallel or perpendicular to one another.

The aftertreatment system 100 includes an inlet conduit 102 configured to receive the exhaust gas from the engine and communicate the exhaust gas to the oxidation catalyst 110 disposed within the housing 170. One or more sensors may be positioned in the inlet conduit 102. These may include, for example, a $NO_x$ sensor (e.g., a physical or virtual $NO_x$ sensor), an oxygen sensor, a particulate matter sensor, a carbon monoxide sensor, a temperature sensor, a pressure sensor, any other sensor or a combination thereof configured to measure one or more operational parameters of the exhaust gas. Such operating parameters may include, for example, an amount of $NO_x$ gases in the exhaust gas, a temperature of the exhaust gas, a flow rate and/or pressure of the exhaust gas. Furthermore, an outlet conduit 104 may be coupled to an outlet of the housing 170 and structured to expel treated exhaust gas into the environment (e.g., treated to remove particulate matter such as soot by the filter 120 and/or reduce constituents of the exhaust gas such as $NO_x$ gases, CO, unburnt hydrocarbons, etc. included in the exhaust gas by the SCR catalyst 150 and the oxidation catalyst 110). Various sensors may include a second $NO_x$ sensor disposed in the outlet conduit, which is configured to determine an amount of $NO_x$ gases expelled into the environment after passing through the aftertreatment components. Others sensors may include, for example, a particulate matter sensor configured to determine an amount of particulate matter (e.g., soot included in the exhaust gas exiting the filter 140) in the exhaust gas being expelled into the environment, or an ammonia sensor configured to measure an amount of ammonia in the exhaust gas flowing out of the SCR catalyst 150, i.e., determine the ammonia slip.

The oxidation catalyst 110 (e.g., a diesel oxidation catalyst) is configured to decompose unburnt hydrocarbons present in the exhaust gas and/or oxidize CO to $CO_2$. In some embodiments, the aftertreatment system 100 may also include a hydrocarbon insertion assembly 116 configured to selectively insert hydrocarbons (e.g., diesel) into the oxidation catalyst 110. The hydrocarbons combust across the oxidation catalyst 110 and increase the temperature of the exhaust gas to a temperature (e.g., greater than 500 degrees Celsius), for example, to regenerate the filter 120 and/or the SCR catalyst 150. A first heater 108 may be operatively coupled to the oxidation catalyst 110 and configured to heat the oxidation catalyst 110 to a light off temperature of the oxidation catalyst at which the oxidation catalyst 110 catalyzes the combustion of the inserted hydrocarbons for increasing the temperature of the exhaust gas.

The filter 120 is disposed downstream of the oxidation catalyst 110 and upstream of the SCR catalyst 150 and configured to remove particulate matter (e.g., soot, debris, inorganic particles, etc.) from the exhaust gas. In various embodiments, the filter 120 may include a ceramic filter. In some embodiments, the filter 120 may include a cordierite or silicon carbide filter which can, for example, be an asymmetric filter. In yet other embodiments, the filter 120 may be catalyzed. In some embodiments, a second heater 122 (e.g., an electric heater) may be coupled to the filter 120 and configured to heat the filter 120 to a regeneration temperature to remove particular matter accumulated on the filter 120.

A mixer 130 is disposed between the filter 120 and the SCR catalyst 150. The mixer 130 may include baffles or veins that are configured to mix reductant inserted into the exhaust gas with the exhaust gas before the exhaust gas is communicated into the SCR catalyst 150. In various embodiments, the mixer 130 may be disposed within a decomposition tube.

In some embodiments, the aftertreatment system 100 includes a reductant storage tank 112 that contains a reductant formulated to facilitate reduction of the constituents of the exhaust gas (e.g., $NO_x$ gases) by the SCR catalyst 150. In embodiments in which the exhaust gas is a diesel exhaust gas, the reductant may include a diesel exhaust fluid (DEF) which provides a source of ammonia. Suitable DEFs can include urea, aqueous solution of urea or any other DEF (e.g., the DEF available under the tradename ADBLUE®). In particular embodiments, the reductant includes an aqueous urea solution containing 32.5 wt % urea and 67.5 wt % de-ionized water. In other embodiments, the reductant includes aqueous urea solution containing 40 wt % urea and 60 wt % de-ionized water.

The reductant insertion assembly 114 is fluidly coupled to the reductant storage tank 112 and is configured to provide the reductant to a reductant injector 156 positioned upstream of or mounted on the mixer 130. In various embodiments, the reductant injector 156 may comprise a nozzle having a predetermined diameter. In various embodiments, the reductant injector 156 may be positioned in a reductant port and structured to deliver a stream or a jet of the reductant into the internal volume of the housing 170 so as to deliver the reductant to the SCR catalyst 150.

The reductant insertion assembly 114 may comprise various structures to facilitate receipt of the reductant from the reductant storage tank 112 and delivery to the reductant injector 156 for insertion into the mixer 130. The reductant insertion assembly 114 may include one or more pumps (e.g., a diaphragm pump, a positive displacement pump, a centrifugal pump, a vacuum pump, etc.) for delivering the reductant to the reductant injector 156 at an operating pressure and/or flow rate. The reductant insertion assembly 114 may also include filters and/or screens (e.g., to prevent solid particles of the reductant or contaminants from flowing into the one or more pumps) and/or valves (e.g., check valves) configured to draw reductant from the reductant storage tank 112. Screens, check valves, pulsation dampers, or other structures may also be positioned downstream of the one or more pumps of the reductant insertion assembly 114 and configured to remove contaminants and/or facilitate delivery of the reductant to the reductant injector 156.

The SCR catalyst 150 is disposed downstream of the mixer 130 and is configured to receive and treat the exhaust gas (e.g., a diesel exhaust gas) flowing through the SCR catalyst 150 in the presence of ammonia. In some embodiments, the SCR catalyst 150 may comprise a selective catalytic reduction filter (SCRF), or any other aftertreatment component configured to decompose constituents of the exhaust gas (e.g., $NO_x$ gases such as nitrous oxide, nitric oxide, nitrogen dioxide, etc.), flowing through the SCR catalyst 150 in the presence of a reductant, as described herein. Any suitable SCR catalyst 150 can be used such as, for example, platinum, palladium, rhodium, cerium, iron, manganese, copper, vanadium based catalysts (including combinations thereof). In particular embodiments, the SCR catalyst 150 includes a copper zeolite catalyst.

The SCR catalyst 150 can be disposed on a suitable substrate such as, for example, a ceramic (e.g., cordierite or silicon carbide) or metallic (e.g., kanthal) monolith core which can, for example, define a honeycomb structure. A washcoat can also be used as a carrier material for the SCR catalyst 150. Such washcoat materials can include, for example, aluminum oxide, titanium dioxide, silicon dioxide, any other suitable washcoat material, or a combination thereof. The exhaust gas can flow over and about the SCR catalyst 150 such that $NO_x$ gases included in the exhaust gas are further reduced to yield an exhaust gas which is substantially free of carbon monoxide and $NO_x$ gases. In some embodiments, an ammonia oxidation catalyst 160 may be disposed downstream of the SCR catalyst 150 and formulated to decompose any unreacted ammonia in the exhaust gas downstream of the SCR catalyst 150 (i.e., reduce ammonia slip).

FIG. 2 is a schematic illustration of an aftertreatment system 200, according to another embodiment. The aftertreatment system 200 includes an upstream oxidation catalyst 210, and a housing 270 within which an upstream SCR catalyst 240, the filter 120, the mixer 130, the SCR catalyst 150, and the ammonia oxidation catalyst 160 are disposed. The aftertreatment system 200 includes the inlet conduit 102 configured to communicate exhaust gas to the aftertreatment components disposed within the housing 270 and the outlet conduit 104 configured to expel treated exhaust gas into the environment. An upstream oxidation catalyst 210 is coupled to the inlet conduit 102 upstream of the housing 270. In some embodiments, hydrocarbons may be inserted into the upstream oxidation catalyst 210 for increasing temperature of the exhaust gas. An upstream reductant injector 206 is mounted on the inlet conduit 102 and configured to insert reductant into the exhaust gas flowing through the inlet conduit 102. The inlet conduit 102 may therefore, also serve as a decomposition tube for decomposing the reductant inserted into the inlet conduit 102. Inserting the reductant upstream of the filter 120 may reduce amount of particulate matter emitted by aftertreatment system 200.

Exhaust gas entering the housing 170 flows first into the upstream SCR catalyst 240. In some embodiments, the upstream SCR catalyst 240 includes a copper zeolite catalyst. A heater 208 (e.g., an electric heater) is operatively coupled to the upstream SCR catalyst 240 and is configured to heat the upstream SCR catalyst 240, for example, to an operative temperature of the SCR catalyst 240. The filter 120 is disposed downstream of the upstream SCR catalyst 240 and configured to filter particulate matter from the exhaust gas. In some embodiments, the filter 120 may include a catalyzed filter. Similar to the aftertreatment system 100, the mixer 130, the SCR catalyst 150, and the ammonia oxidation catalyst 160 are disposed downstream of the filter 120. The reductant injector 156 is disposed on the mixer 130 and configured to insert reductant into the mixer 130, as previously described herein. The combination of the upstream SCR catalyst 240 and the SCR catalyst 150 enhance $NO_x$ conversion efficiency of the aftertreatment system 200 by providing two stage $NO_x$ reduction. In some embodiments, additional $NO_x$ sensors, ammonia sensors, temperature sensor, a combination $NO_x$ and ammonia sensor, and/or any other sensors may be disposed between the upstream SCR catalyst 240 and the SCR catalyst 150. Information received from these sensors may be used to control an amount of reductant inserted by the reductant injector 156 into the exhaust gas.

FIG. 3 is a schematic illustration of an aftertreatment system 300, according to another embodiment. The aftertreatment system 300 is substantially similar to the aftertreatment system 100 and includes the housing 170 within which the oxidation catalyst 110, the filter 120, the mixer 130, the SCR catalyst 150, and the ammonia oxidation catalyst 160 are disposed. Different from the aftertreatment system 100, the aftertreatment system 300 includes an upstream oxidation catalyst 309 fluidly coupled to the inlet conduit 102. In some embodiments, the upstream oxidation catalyst 309 may be disposed within the inlet conduit 102. In some embodiments, the upstream oxidation catalyst 309 may be configured to remove unburnt hydrocarbons from the exhaust gas. In some embodiments, the hydrocarbon insertion assembly 116 may be used to insert hydrocarbons into the upstream oxidation catalyst 309. The upstream oxidation catalyst 309 may cause the hydrocarbons to combust so as to increase a temperature of the exhaust gas, for example, to facilitate increase of a temperature of the oxidation catalyst 110 and/or the SCR catalyst 150 to an operating temperature during cold start. In such embodiments, the first heater 108 is excluded from the aftertreatment system 300. For example, the upstream oxidation catalyst 309 may have a lower light-off temperature than the oxidation catalyst 110, that is can catalyze the combustion of the hydrocarbons at a lower operating temperature relative to the oxidation catalyst 110.

Figure 4:
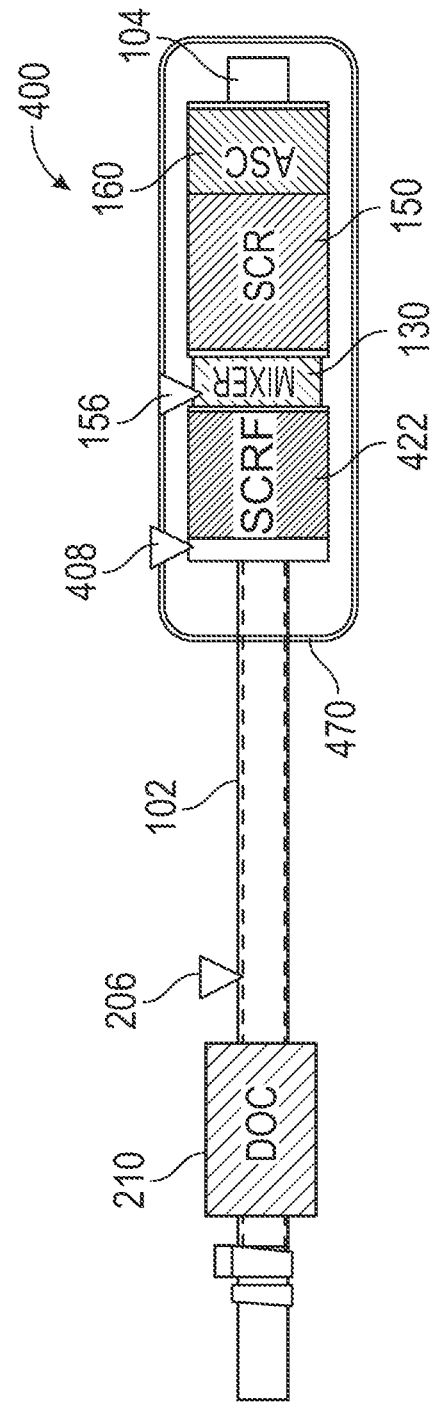
FIG. 4 is a schematic illustration of an aftertreatment system, according to yet another embodiment.

FIG. 4 is a schematic illustration of an aftertreatment system 400, according to still another embodiment. The aftertreatment system 400 includes the upstream oxidation catalyst 210, and a housing 470 within which a SCR filter (SCRF) 422, the mixer 130 with a reductant injector 156 disposed thereon, the SCR catalyst 150, and the ammonia oxidation catalyst 160 are disposed. The aftertreatment system 400 includes the inlet conduit 102 configured to communicate exhaust gas to the aftertreatment components disposed within the housing 470 and the outlet conduit 104 configured to expel treated exhaust gas into the environment. The upstream oxidation catalyst 210 is coupled to the inlet conduit 102 upstream of the housing 470 as described with respect to FIG. 4. The upstream reductant injector 206 is mounted on the inlet conduit 102 and configured to insert reductant into the exhaust gas flowing through the inlet conduit 102, as described with respect to FIG. 2. Inserting the reductant upstream of the filter 120 may reduce amount of particulate matter emitted by aftertreatment system 400.

Exhaust gas entering the housing 470 flows first into SCRF 422. The SCRF 422 performs the dual function of treating constituents of the exhaust gas (e.g., decompose $NO_x$ gases included in the exhaust gas), as well as filter particulate matter present in the exhaust gas. The exhaust gas then flows into the mixer 130 where reductant is inserted into the mixer 130, and then communicated to the SCR catalyst 150 for further treating the constituents of the exhaust gas. The SCRF 422 located upstream of the SCR catalyst 150 provides pretreatment of the exhaust gas (e.g., reducing $NO_x$ constituents of the exhaust gas) before the exhaust gas is communicated to the SCR catalyst 150. The combination of the SCRF 422 and the SCR catalyst 150 increase $NO_x$ conversion efficiency of the aftertreatment system 400 by providing two stage $NO_x$ reduction, while also reducing space claim by allowing removal of a filter from aftertreatment system 400. In some embodiments, additional $NO_x$ sensors, ammonia sensors, temperature sensor, a combination $NO_x$ and ammonia sensor, and/or any other sensors may be disposed between the SCRF 422 and the SCR catalyst 150. Information received from these sensors may be used to control an amount of reductant inserted by the reductant injector 156 into the exhaust gas.

Figure 5:
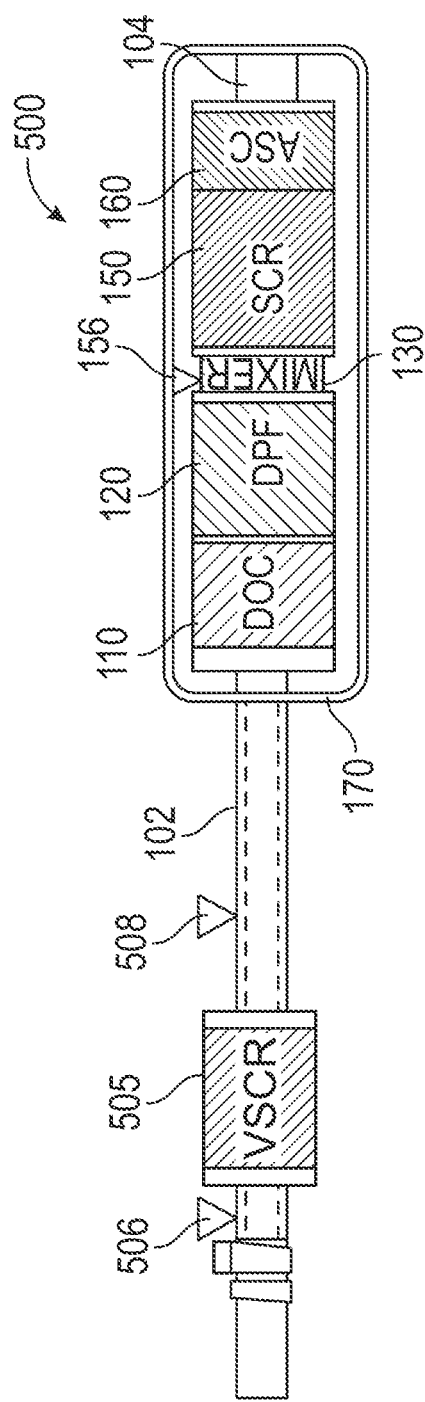
FIG. 5 is a schematic illustration of an aftertreatment system, according to still another embodiment.

FIG. 5 is a schematic illustration of an aftertreatment system 500, according to still another embodiment. The aftertreatment system 500 is substantially similar to the aftertreatment system 100 and includes the housing 170 within which the oxidation catalyst 110, the filter 120 (e.g., a catalyzed filter), the mixer 130, the SCR catalyst 150, and the ammonia oxidation catalyst 160 are disposed, and the inlet conduit 102 that communicates exhaust gas to the components within the housing 170. Different from the aftertreatment system 100, the aftertreatment system 500 does not include the first heater 108 and the second heater 122. Instead, a vanadium SCR (vSCR) catalyst 505 is coupled to the inlet conduit 102 upstream of the housing 170.

An upstream reductant injector 506 is disposed upstream of the vSCR catalyst 505 and configured to insert reductant into the exhaust gas. The vSCR catalyst 505 is formulated to operate at lower temperatures and causes an increase in the temperature of the exhaust gas as it catalyzes the reduction of $NO_x$ constituents included in the exhaust gas (e.g., in an exothermic reaction). The vSCR catalyst 505 may increase a temperature of the exhaust gas to an operating temperature of the oxidation catalyst 110 such that a separate heater is not needed. Inserting the reductant upstream of the filter 120 may reduce amount of particulate matter emitted by aftertreatment system 500. A hydrocarbon injector 508 is disposed downstream of the vSCR catalyst 505 and configured to selectively insert hydrocarbons (e.g., provided by the reductant insertion assembly 114) into the exhaust gas before the exhaust gas enters the oxidation catalyst 110. In some embodiments, additional $NO_x$ sensors, ammonia sensors, temperature sensor, a combination $NO_x$ and ammonia sensor, and/or any other sensors may be disposed between the vSCR catalyst 505 and the SCR catalyst 150 (e.g. in the inlet conduit 102 downstream of the vSCR 505). Information received from these sensors may be used to control an amount of reductant inserted by the reductant injector 156 into the exhaust gas.

Figure 6:
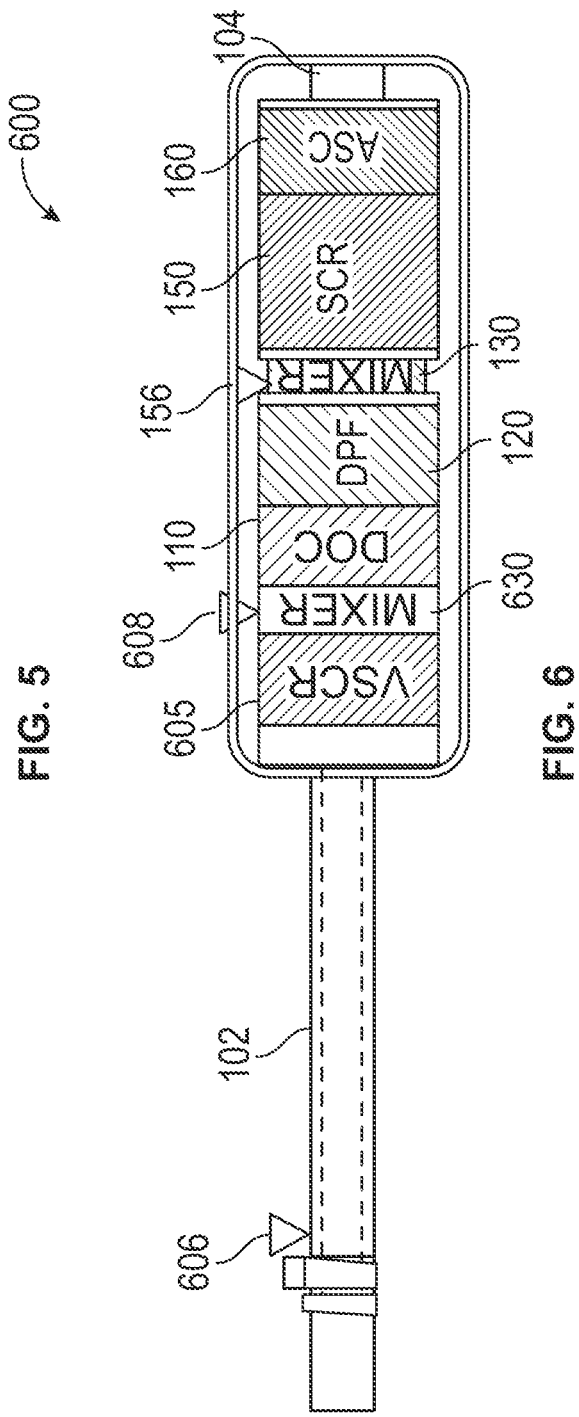
FIG. 6 is a schematic illustration of an aftertreatment system, according to yet another embodiment.

FIG. 6 is a schematic illustration of an aftertreatment system 600, according to an embodiment. The aftertreatment system 600 is similar to the aftertreatment system 500 and includes a housing 670 within which the oxidation catalyst 110, the filter 120 (e.g., a catalyzed filter), the mixer 130, the SCR catalyst 150, and the ammonia oxidation catalyst 160 are disposed. However, different from the aftertreatment system 500, a vSCR catalyst 605 is also disposed within the housing 670 upstream of the oxidation catalyst 110. An upstream, reductant injector 606 is coupled to the inlet conduit upstream of the vSCR catalyst 605 and configured to insert reductant into the exhaust gas upstream of the vSCR catalyst 605. Inserting the reductant upstream of the filter 120 may reduce amount of particulate matter emitted by aftertreatment system 600. An upstream mixer 630 is disposed between the vSCR catalyst 605 and the oxidation catalyst 110. A hydrocarbon injector 608 is coupled to the upstream mixer 630 and configured to insert hydrocarbons into the exhaust gas. The upstream mixer 630 facilitates mixing of the hydrocarbons with the exhaust gas before it is communicated to the oxidation catalyst 110. In some embodiments, additional $NO_x$ sensors, ammonia sensors, temperature sensor, a combination $NO_x$ and ammonia sensor, and/or any other sensors may be disposed between the vSCR catalyst 605 and the SCR catalyst 150. Information received from these sensors may be used to control an amount of reductant inserted by the reductant injector 156 into the exhaust gas.

FIGS. 7-10 are various views of an aftertreatment system 700 for treating constituents of an exhaust gas (e.g., diesel gas), according to an embodiment. The aftertreatment system 700 includes a housing 770 defining a first internal volume 772 and a second internal volume 774 that is fluidly isolated from the first internal volume. For example, a plate 773 may extend along a major axis of the housing 770 and divides the housing 770 into the first internal volume 772 and the second internal volume 774. Mounting brackets 790 or other mounting features may be provided on the housing 770 to allow the housing 770 to be mounted on a structure (e.g., a vehicle chassis). The aftertreatment system 700 includes a first aftertreatment leg 710', a second aftertreatment leg 750', and a decomposition tube 780 disposed within the housing 770.

A first aftertreatment leg 710' extends from the first internal volume 772 to the second internal volume 774, for example, in a direction parallel to a minor axis of the housing 770. For example, the first aftertreatment leg 710' may extend along a shortest dimension of the housing 770. Corresponding openings may be defined in the plate 773 to allow the first aftertreatment leg 710' from the first internal volume 772 to the second internal volume 774. Additional plates may also be disposed parallel the plate 773, and may serve as brackets to support the first aftertreatment leg 710', the second aftertreatment leg 750', and the decomposition tube 780.

The first aftertreatment leg 710' includes an oxidation catalyst 710 extending along a first axis $A_{L1}$ that may be parallel to the minor axis of the housing 770. The oxidation catalyst 710 is configured to receive at least a portion of the exhaust gas via an inlet conduit 702 fluidly coupled to the oxidation catalyst 710. The oxidation catalyst 710 may have a diameter in a range of 300 mm to 350 mm, inclusive and a length in a range of 90 mm to 110 mm, inclusive. In some embodiments, the inlet conduit 702 comprises an inlet cone 704 that has a constantly expanding cross-section from an upstream end to a downstream end of the inlet conduit 702. The downstream end of the inlet cone 704 is coupled to the first aftertreatment leg 710'. The inlet cone 704 may serve as a diffuser to decrease a flow velocity of the exhaust gas and spread the exhaust gas flow across a face of the oxidation catalyst 710.

Figure 7:
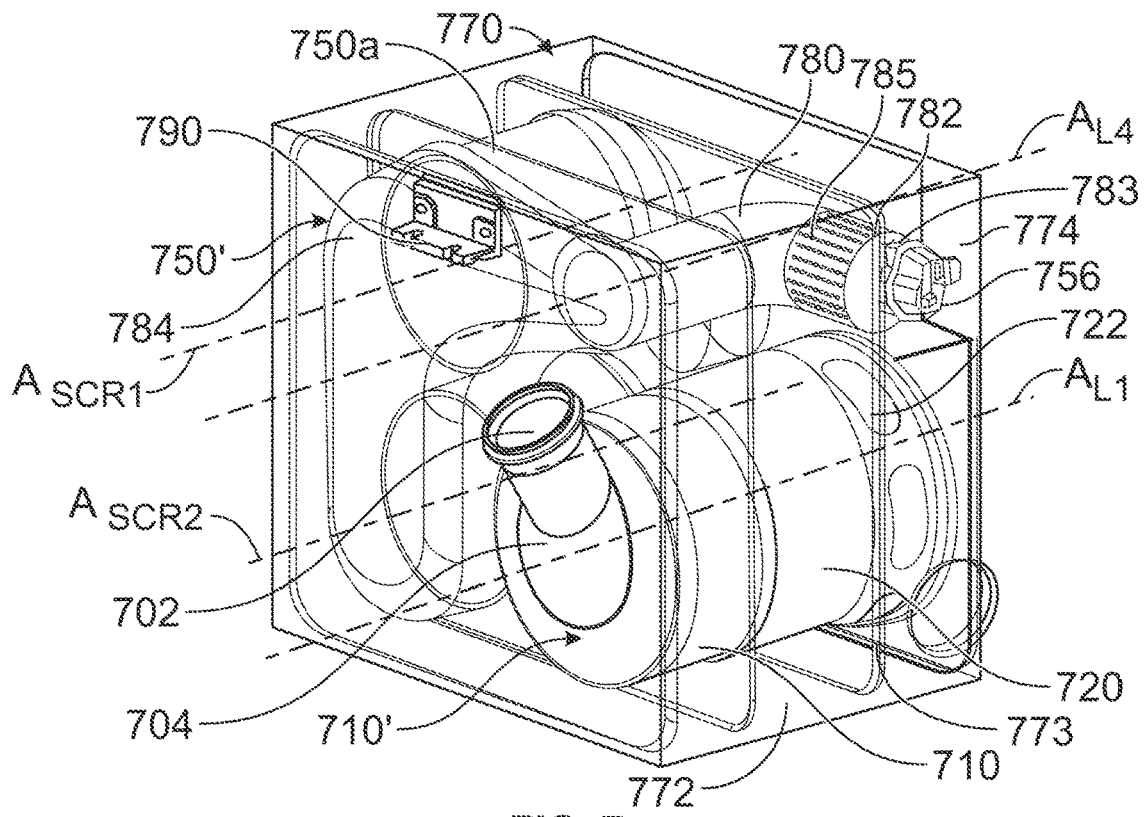
FIG. 7 is a top, front, right side perspective view of an aftertreatment system, according to an embodiment.
Figure 9:
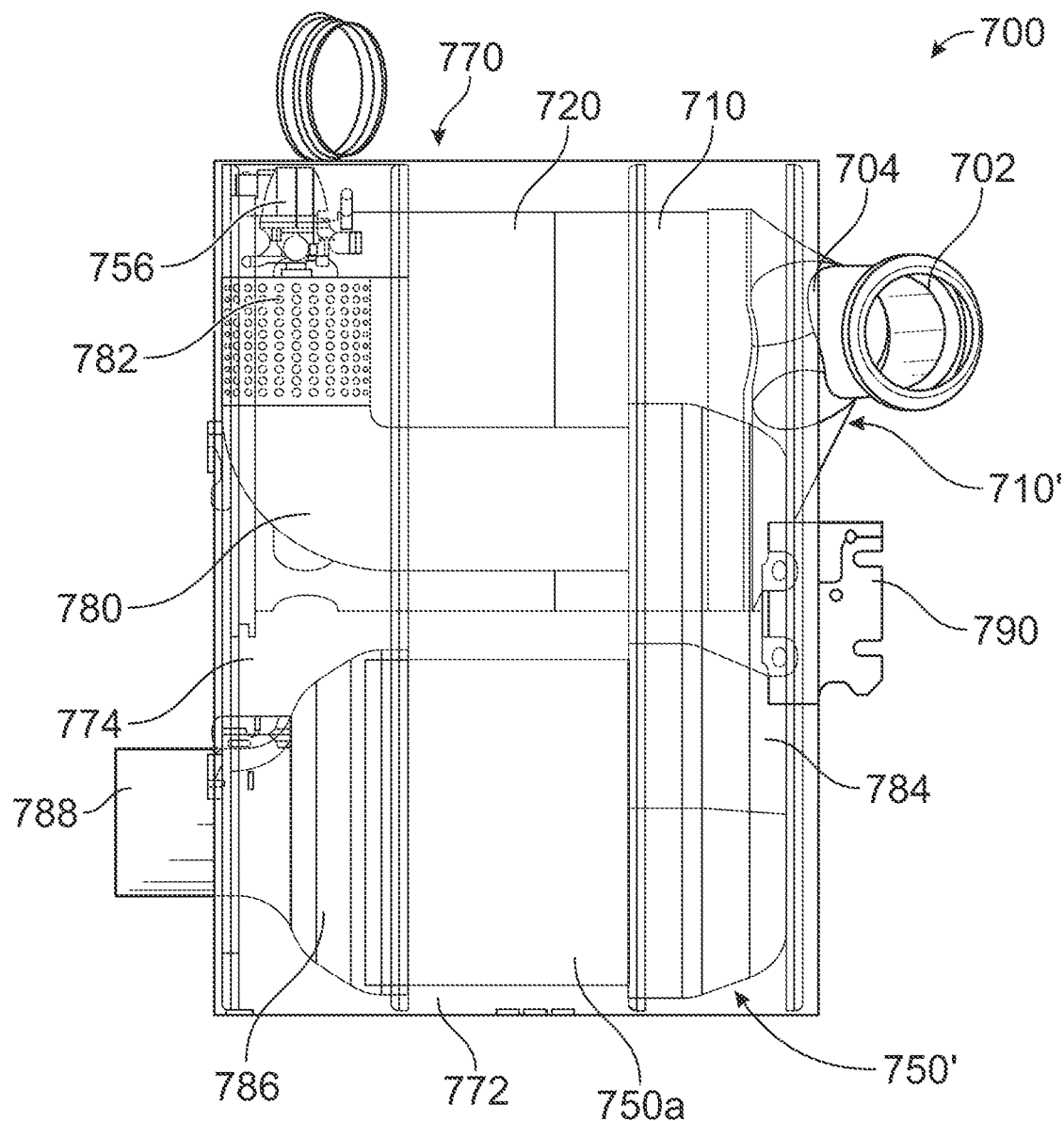
FIG. 9 is a top view of the aftertreatment system of FIG. 7.
Figure 10:
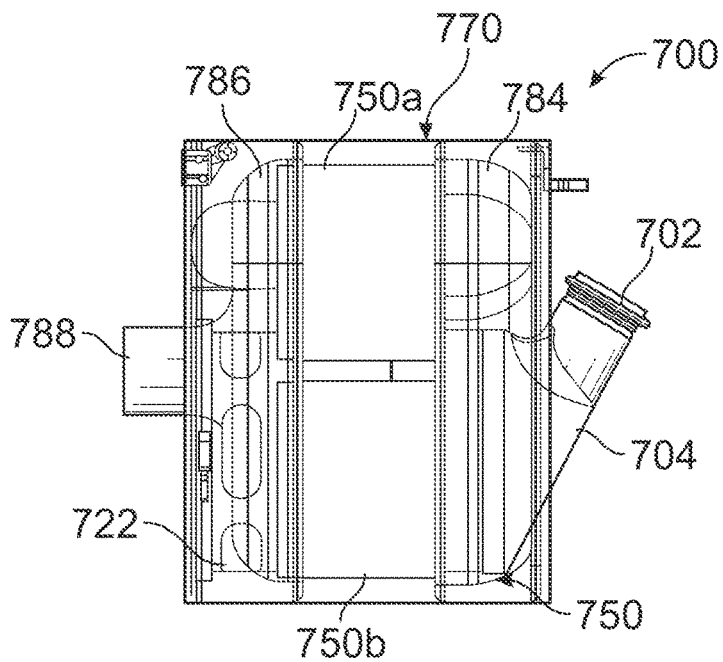
FIG. 10 is a left side view of the aftertreatment system of FIG. 7.
Figure 11:
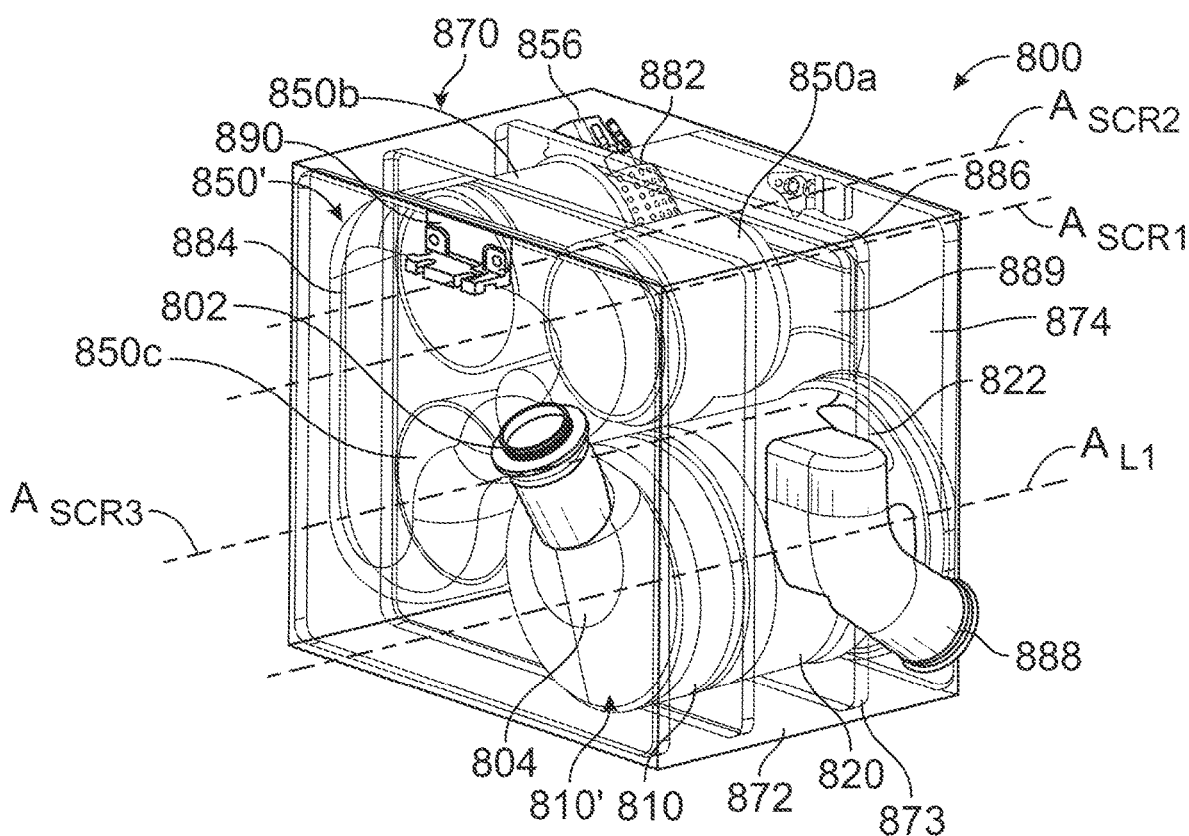
FIG. 11 is a top, front, right side perspective view of an aftertreatment system, according to an embodiment.
Figure 12:
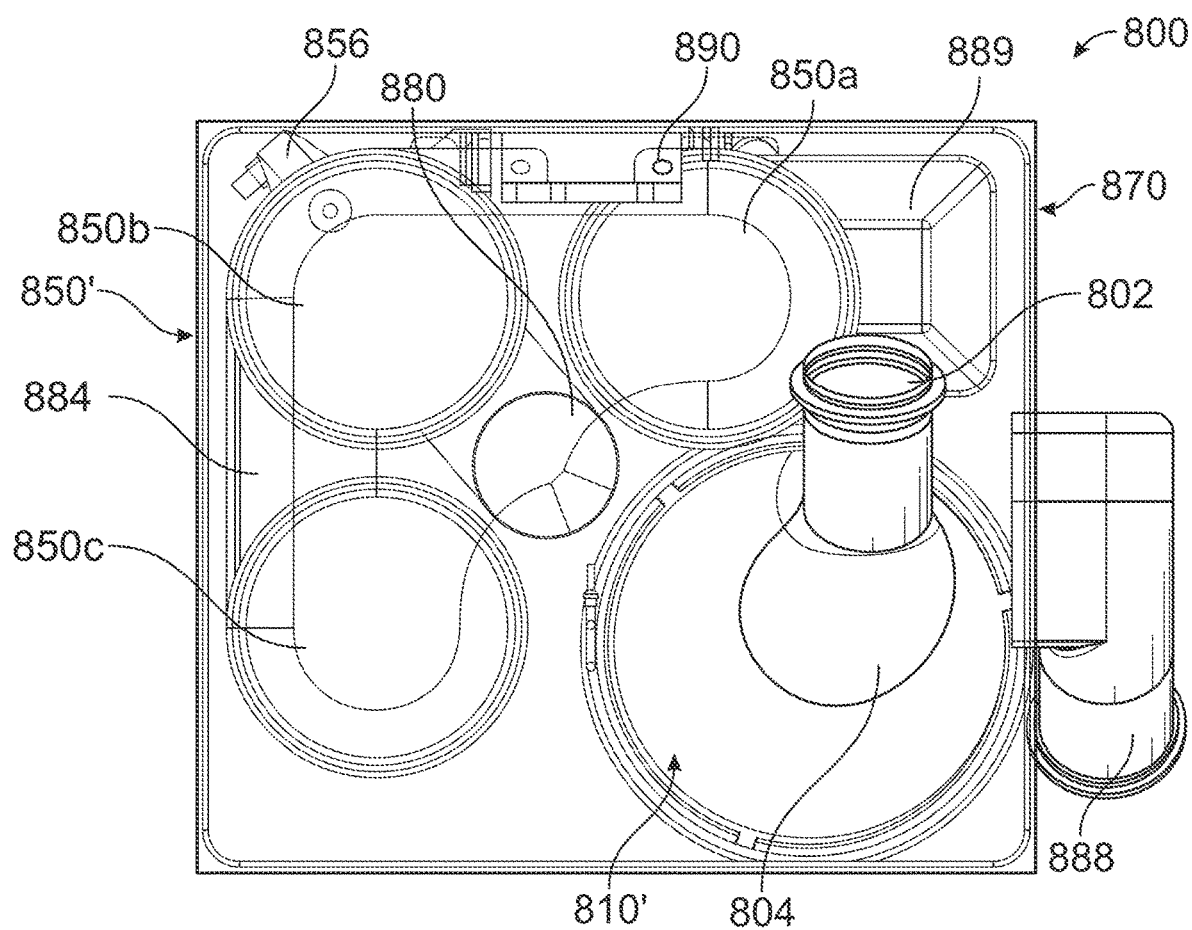
FIG. 12 is a front view of the aftertreatment system of FIG. 11.

A filter 720 (e.g., a diesel particulate filter) is disposed downstream of the oxidation catalyst 710 and axially aligned with the oxidation catalyst 710. An outlet 722 of the filter 720 is disposed within the second internal volume 774 and is configured to emit exhaust gas into the second internal volume 774 after the exhaust gas has passed through the first aftertreatment leg 710'. As shown in FIGS. 7 and 9-10, the outlet 722 of the filter 720 may include a plurality of circumferential slits defined in the a housing of the filter at an end thereof that is located in the second internal volume 774. Exhaust gas flows in a first direction through the first aftertreatment leg 710' and is released into the second internal volume 774. The filter 720 may have a diameter in range of 300 mm to 350 mm, inclusive and a length in a range of 150 mm to 200 mm, inclusive.

Figure 8:
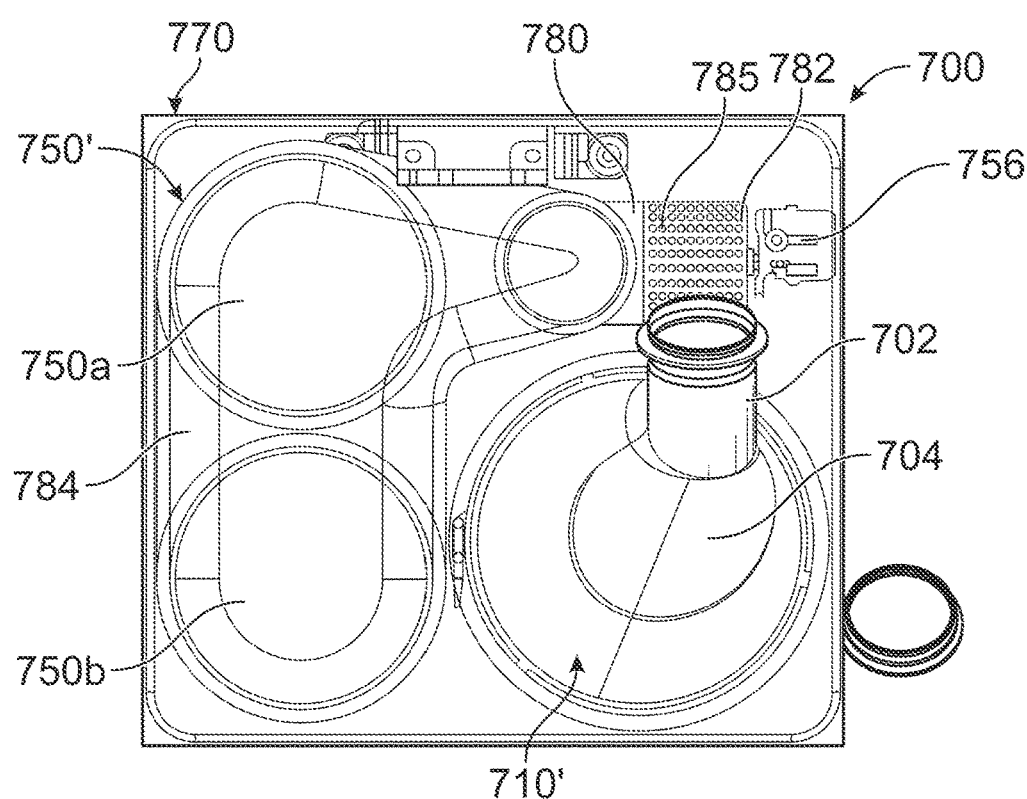
FIG. 8 is a front view of the aftertreatment system of FIG. 7.

The second aftertreatment leg 750' comprises at least one SCR catalyst disposed in at least the first internal volume and extending along a second axis that is parallel to and offset from the first axis such that an inlet of the at least one SCR catalyst is disposed in the first internal volume 772. For example, as shown in FIG. 7-8, the second aftertreatment leg 750' includes a first SCR catalyst 750a and a second SCR catalyst 750b. The first SCR catalyst 750a extends along a first SCR axis $A_{SCR1}$ and the second SCR catalyst 750b extends along a second SCR axis $A_{SCR2}$ that are parallel to each other, and are also parallel to the first axis $A_{L1}$. The first SCR axis $A_{SCR1}$ and the second SCR axis $A_{SCR2}$ may be aligned with each other along a vertical plane. In some embodiments, each of the first SCR catalyst 750a and the second SCR catalyst 750b have a diameter in a range of 250 mm to 300 mm, inclusive and a length in a range of 220 mm to 260 mm, inclusive.

The decomposition tube 780 extends from the second internal volume 774 to the first internal volume 772 along an axis that is parallel to and offset from the first axis $A_{L1}$, the first SCR axis $A_{SCR1}$ and the second SCR axis $A_{SCR2}$. In the particular embodiment of FIGS. 7-10, the decomposition tube 780 is disposed vertically upwards of the first aftertreatment leg 710', but may be located at any other suitable location. An inlet 782 of the decomposition tube 780 is disposed in the second internal volume 774 such that the decomposition tube 780 is configured to receive the exhaust gas emitted into the second internal volume 774, and communicate the exhaust gas from the second internal volume 774 to the inlet of the SCR catalysts 750a and 750b in the first internal volume. A reductant injection inlet is defined proximate to the inlet 782 of the decomposition tube 780 and configured to allow reductant to be injected into the decomposition tube 780. A reductant injector 756 is mounted on the decomposition tube 780 proximate to the inlet 782 of the decomposition tube 780 and is configured to insert a reductant into the decomposition tube 780 via the reductant injection inlet.

In some embodiments, the inlet 782 of decomposition tube 780 is oriented at an angle that is perpendicular to the axis of the decomposition tube 780 and located proximate to the outlet 722 of the filter 720. In some embodiments, the inlet 782 of the decomposition tube 780 includes a flat end face 783 on which the reductant injector 756 is mounted. A plurality of pores 785 are defined through a wall of the decomposition tube 780 at the inlet 782 of the decomposition tube 780 and configured to allow the exhaust gas to enter the decomposition tube 780.

The aftertreatment system 700 further comprises a SCR inlet plenum 784 disposed in the first internal volume 772 and fluidly coupled to respective inlets of each of the two SCR catalysts 750a and 750b. An outlet of the decomposition tube 780 is fluidly coupled to the SCR inlet plenum 784. The decomposition tube 780 receives exhaust gas from the second internal volume 774 and communicates the exhaust gas to the SCR inlet plenum 784 in a second direction that is substantially opposite the first direction (e.g., oriented at an angle of 180±10 degrees with respect to the first direction). The SCR inlet plenum 784 is configured to redirect exhaust gas flowing therein towards respective inlets of each of the two SCR catalysts 750a and 750b such that the exhaust gas flows in a third direction through the second aftertreatment leg 750'. The third direction is substantially opposite the second direction, i.e., in the same direction as the first direction. An SCR outlet plenum 786 is disposed in the second internal volume 774 and coupled to respective outlets of each of the two SCR catalysts 750a and 750b. The SCR outlet plenum 786 defines an outlet conduit 788 that extends through a sidewall of the housing 770, and emits treated exhaust gas into the environment.

FIGS. 11-14 are various views of an aftertreatment system 800 for treating constituents of an exhaust gas (e.g., diesel gas), according to an embodiment. The aftertreatment system 800 includes a housing 870 defining a first internal volume 872 and a second internal volume 874 that is fluidly isolated from the first internal volume 872. For example, a plate 873 may extend along a major axis of the housing 870 and divides the housing 870 into the first internal volume 872 and the second internal volume 874. Mounting brackets 890 or other mounting features may be provided on the housing 870 to allow the housing 870 to be mounted on a structure (e.g., a vehicle chassis). The aftertreatment system 800 includes a first aftertreatment leg 810', a second aftertreatment leg 850', and a decomposition tube 880 disposed within the housing 870.

A first aftertreatment leg 810' extends from the first internal volume 872 to the second internal volume 874 in a direction parallel to a minor axis of the housing 870. For example, the first aftertreatment leg 810' may extend along a shortest dimension of the housing 870. Corresponding openings may be defined in the plate 873 to allow the first aftertreatment leg 810' to extend from the first internal volume 872 to the second internal volume 874. Additional plates may also be disposed parallel the plate 873, and may serve as brackets to support the first aftertreatment leg 810', the second aftertreatment leg 850', and the decomposition tube 880.

The first aftertreatment leg 810' includes an oxidation catalyst 810 extending along a first axis $A_{L1}$ that may be parallel to the minor axis of the housing 870. The oxidation catalyst 810 is configured to receive at least a portion of the exhaust gas via an inlet conduit 802 fluidly coupled to the oxidation catalyst 810. The oxidation catalyst 810 may have a diameter in a range of 300 mm to 350 mm, inclusive, and a length in a range of 90 mm to 110 mm, inclusive. In some embodiments, the inlet conduit 802 comprises an inlet cone 804 that has a constantly expanding cross-section from an upstream end to a downstream end of the inlet conduit 802, as described with respect to the inlet conduit 702.

A filter 820 (e.g., a diesel particulate filter) is disposed downstream of the oxidation catalyst 810 and axially aligned with the oxidation catalyst 810. An outlet 822 of the filter 820 is disposed within the second internal volume 874 and is configured to emit exhaust gas into the second internal volume 874 after passing through the first aftertreatment leg 810'. The outlet 822 of the filter 820 includes a plurality of circumferential slits defined in a housing of the filter 820 at an end thereof that is located in the second internal volume 874. Exhaust gas flows in a first direction through the first aftertreatment leg 810' and is released into the second internal volume 874. The filter 820 may have a diameter in range of 300 mm to 350 mm, inclusive and a length in a range of 150 mm to 200 mm, inclusive.

The second aftertreatment leg 850' comprises three SCR catalysts 850a, 850b, and 850c. A first SCR catalyst 850a of the three SCR catalysts 850a, 850b, 850c is parallel to a second SCR catalyst 850b of the three SCR catalysts 850a, 850b, 850c. Moreover, a third SCR catalyst 850c of the three SCR catalysts 850a, 850b, 850c is disposed parallel to the second SCR catalyst 850b. The first SCR catalyst 850a extends along a first SCR axis $A_{SCR1}$, the second SCR catalyst 850b extends along a second SCR axis $A_{SCR2}$, and the third SCR catalyst 850c extends along a third SCR axis $A_{SCR3}$, each of which is parallel to the first axis $A_{L1}$. Each of the three SCR catalysts may have a diameter in a range of 200 mm to 250 mm, inclusive and a length in a range of 200 mm to 230 mm, inclusive.

Figure 13:
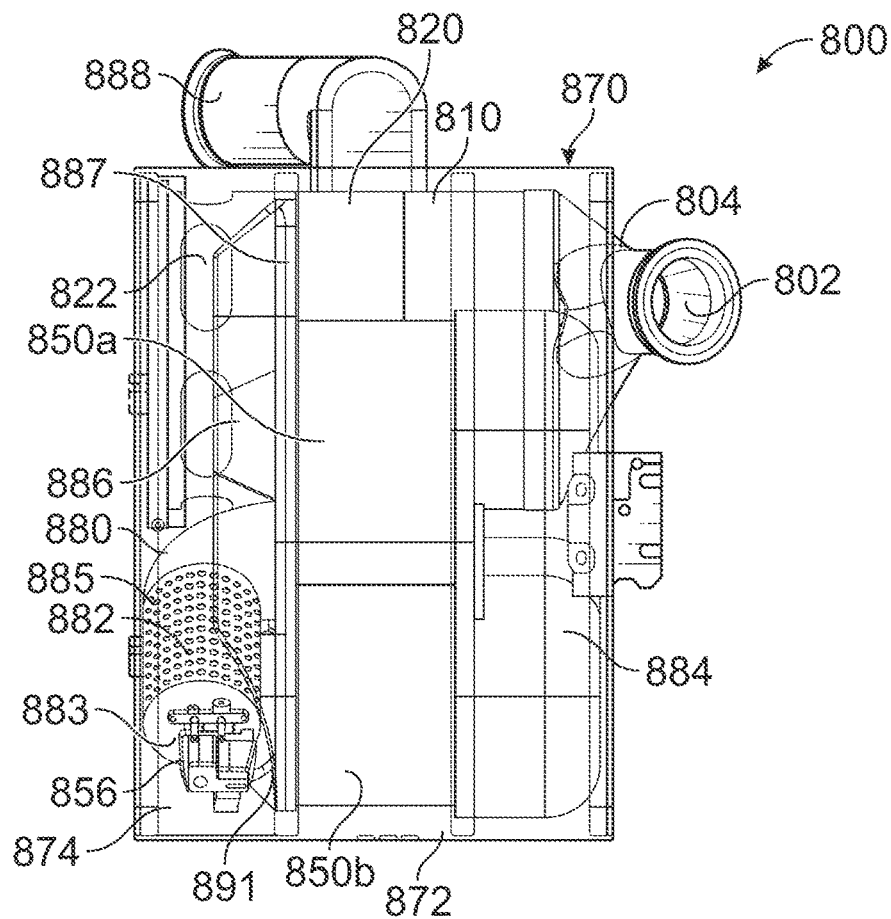
FIG. 13 is a top view of the aftertreatment system of FIG. 11.
Figure 14:
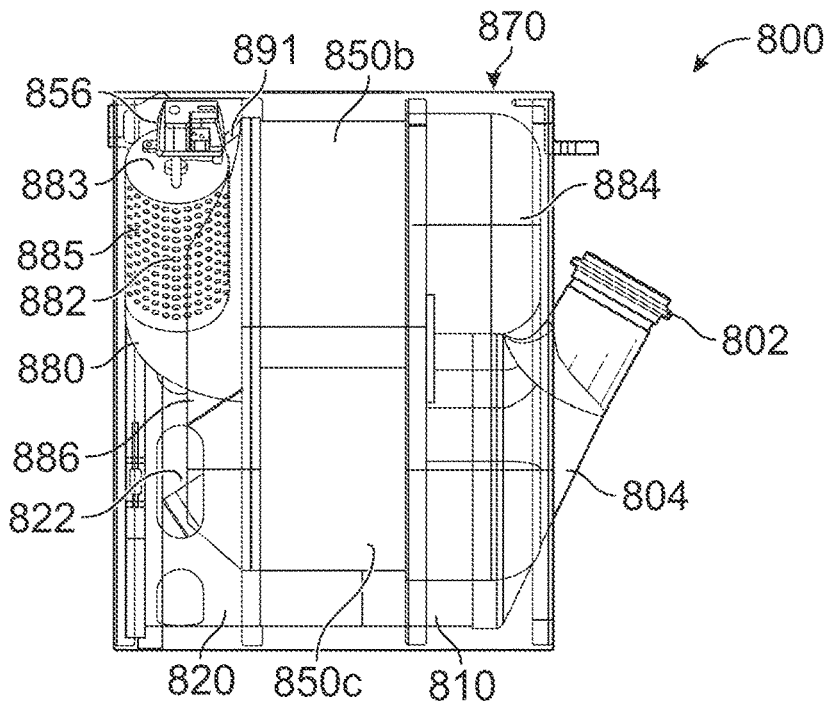
FIG. 14 is a left side view of the aftertreatment system of FIG. 11.
Figure 15:
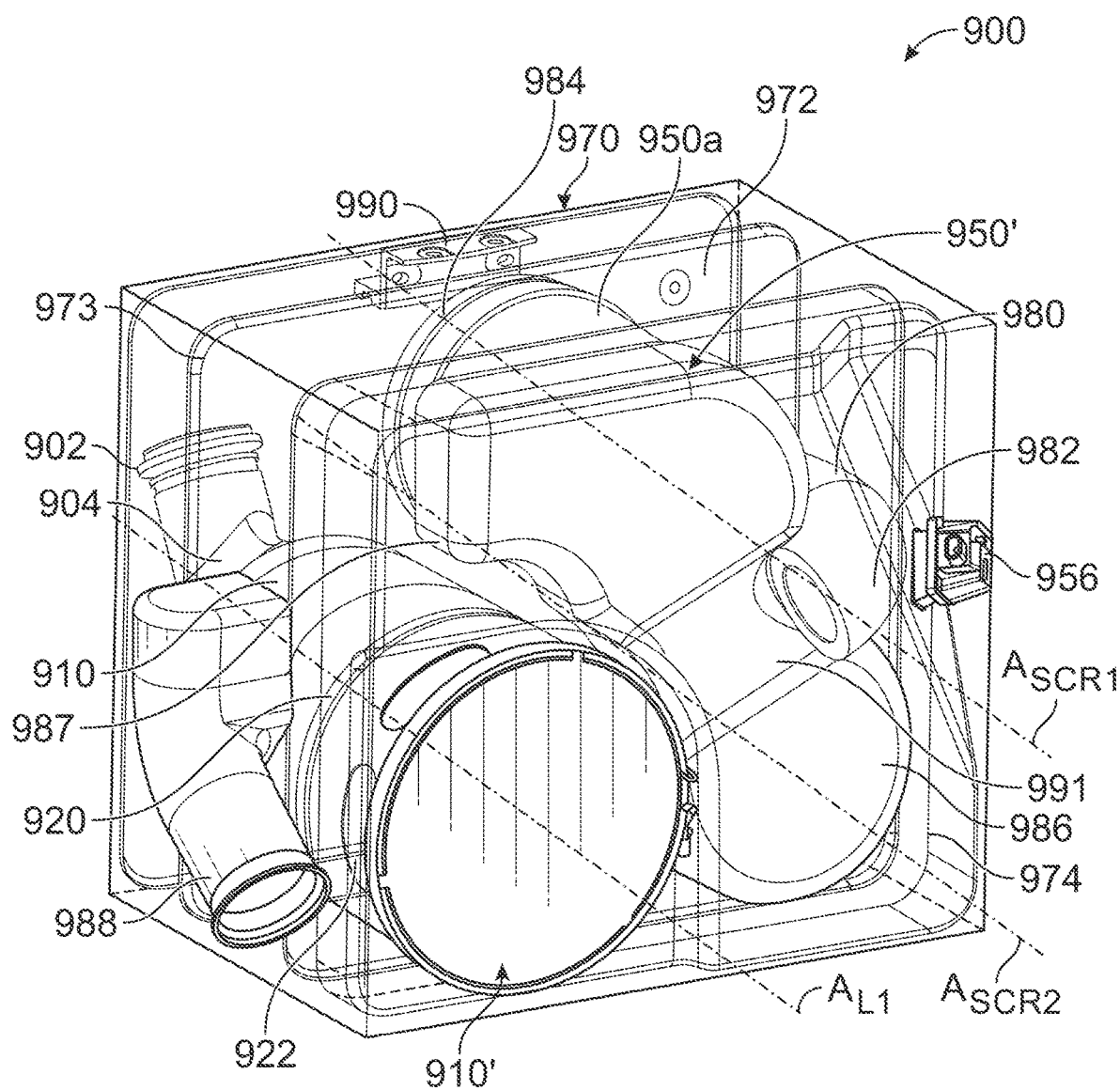
FIG. 15 is a top, rear, left side perspective view of an aftertreatment system, according to an embodiment.

The decomposition tube 880 extends from the second internal volume 874 to the first internal volume 872 along an axis that is parallel to and offset from each of the first axis $A_{L1}$, the first SCR axis $A_{SCR1}$, the second SCR axis $A_{SCR2}$, and the third SCR axis $A_{SCR3}$. As shown in FIGS. 13-14, an inlet 882 of the decomposition tube 880 is disposed in the second internal volume 874 such that the decomposition tube 880 is configured to receive the exhaust gas emitted into the second internal volume 874, and communicate the exhaust gas from the second internal volume 874 to the inlets of the SCR catalysts 850a/b/c in the first internal volume. A reductant injection inlet is defined proximate to the inlet 882 of the decomposition tube 880 and configured to allow reductant to be injected into the decomposition tube 880. A reductant injector 856 is mounted on the decomposition tube 880 proximate to the inlet 882 of the decomposition tube 880 and configured to insert a reductant into the decomposition tube 880 via the reductant injection inlet.

In some embodiments, the inlet 882 of decomposition tube 880 is oriented at an angle that is perpendicular to the axis of the decomposition tube 880 and located proximate to the outlet 822 of the filter 820. The inlet 882 of the decomposition tube 880 includes a flat end face 883 on which the reductant injector 856 is mounted. A plurality of pores 885 are defined through a wall of the decomposition tube 880 at the inlet 882 of the decomposition tube 880 and configured to allow the exhaust gas to enter the decomposition tube 880. The decomposition tube 880 is disposed proximate to a central portion of the housing 870 such that the decomposition tube 880 is surrounded by the three SCR catalysts 850a/b/c and the first aftertreatment leg 810'.

The aftertreatment system 800 further comprises a SCR inlet plenum 884 disposed in the first internal volume 872 and fluidly coupled to respective inlets of each of the first SCR catalyst 850a, the second SCR catalyst 850b, and the third SCR catalyst 850c. An outlet of the decomposition tube 880 is fluidly coupled to the SCR inlet plenum 884. The decomposition tube 880 receives exhaust gas from the second internal volume 874 and communicates the exhaust gas to the SCR inlet plenum 884 in a second direction that is substantially opposite the first direction. The SCR inlet plenum 884 is configured to redirect exhaust gas flowing therein towards respective inlets of each of the three SCR catalysts 850a, 850b and 850c such that the exhaust gas flows in a third direction through the second aftertreatment leg 850'. The third direction is opposite the second direction, i.e., in the same direction as the first direction.

An SCR outlet plenum 886 is disposed in the second internal volume 874 and coupled to respective outlets of each of the first, second and third SCR catalysts 850a, 850b, and 850c. The SCR outlet plenum 886 defines an outlet 889 that is fluidly coupled to the first internal volume 872 and is configured to release treated exhaust gas into the first internal volume 872. An outlet conduit 888 is coupled to a sidewall of the housing 870 forming the first internal volume 872 and is configured to expel the treated exhaust gas that is communicated into the first internal volume 872 via the SCR outlet plenum 886, into the environment. A groove 891 is defined in a sidewall of the SCR outlet plenum 886 that is perpendicular to the axes $A_{SCR1}$, $A_{SCR2}$, and $A_{SCR3}$ of the first, second, and third SCR catalysts 850a, 850b, 850c, respectively. A portion of the inlet 882 of the decomposition tube 880 is disposed in the groove 891.

FIGS. 15-18 are various views of an aftertreatment system 900 for treating constituents of an exhaust gas (e.g., diesel gas), according to another embodiment. The aftertreatment system 900 includes a housing 970 defining a first internal volume 972 and a second internal volume 974 that is fluidly isolated from the first internal volume 972. For example, a plate 973 may extend along a major axis of the housing 970 and divides the housing 970 into the first internal volume 972 and the second internal volume 974. Mounting brackets 990 or other mounting features may be provided on the housing 970 to allow the housing 970 to be mounted on a structure (e.g., a vehicle chassis). The aftertreatment system 900 includes a first aftertreatment leg 910', a second aftertreatment leg 950', and a decomposition tube 980 disposed within the housing 970.

The first aftertreatment leg 910' extends from the first internal volume 972 to the second internal volume 974 in a direction parallel to a minor axis of the housing 970. For example, the first aftertreatment leg 910' may extend along a shortest dimension of the housing 970. Corresponding openings may be defined in the plate 973 to allow the first aftertreatment leg 910' to extend from the first internal volume 972 to the second internal volume 974. Additional plates may also be disposed parallel to the plate 973, and may serve as brackets to support the first aftertreatment leg 910', the second aftertreatment leg 950', and the decomposition tube 980.

The first aftertreatment leg 910' includes an oxidation catalyst 910 extending along a first axis $A_{L1}$ that may be parallel to the minor axis of the housing 970. The oxidation catalyst 910 is configured to receive at least a portion of the exhaust gas via an inlet conduit 902 fluidly coupled to the oxidation catalyst 910. The oxidation catalyst 910 may have a diameter in a range of 300 mm to 350 mm, inclusive and a length in a range of 150 mm to 200 mm, inclusive. In some embodiments, the inlet conduit 902 comprises an inlet cone 904 that has a constantly expanding cross-section from an upstream end to a downstream end of the inlet conduit 902, as described with respect to the inlet conduit 702, 802.

A filter 920 (e.g., a diesel particulate filter) is disposed downstream of the oxidation catalyst 910 and axially aligned with the oxidation catalyst 910. An outlet 922 of the filter 920 is disposed within the second internal volume 974 and is configured to emit exhaust gas into the second internal volume 974 after passing through the first aftertreatment leg 910'. The outlet 922 of the filter 920 includes a plurality of circumferential slits defined in a housing of the filter 920 at an end thereof that is located in the second internal volume 974. Exhaust gas flows in a first direction through the first aftertreatment leg 910' and is released into the second internal volume 974. The filter 920 may have a diameter in range of 300 mm to 350 mm, inclusive and a length in a range of 150 mm to 200 mm, inclusive.

The second aftertreatment leg 950' comprises two SCR catalysts, a first SCR catalyst 950a and the second SCR catalyst 950b that are disposed parallel to and offset from each other as well as the first axis $A_{L1}$. A first linear distance d1 from the first axis $A_{L1}$ to a first SCR axis $A_{SCR1}$ of the first SCR catalyst 950a is substantially equal to a second linear distance d2 from the first axis $A_{L1}$ to a second SCR axis $A_{SCR2}$ of the second SCR catalyst 950b. Each of the first SCR catalyst 950a and the second SCR catalyst 950b may have a diameter in a range of 250 mm to 300 mm, inclusive and a length in range of 220 mm to 260 mm, inclusive.

Figure 16:
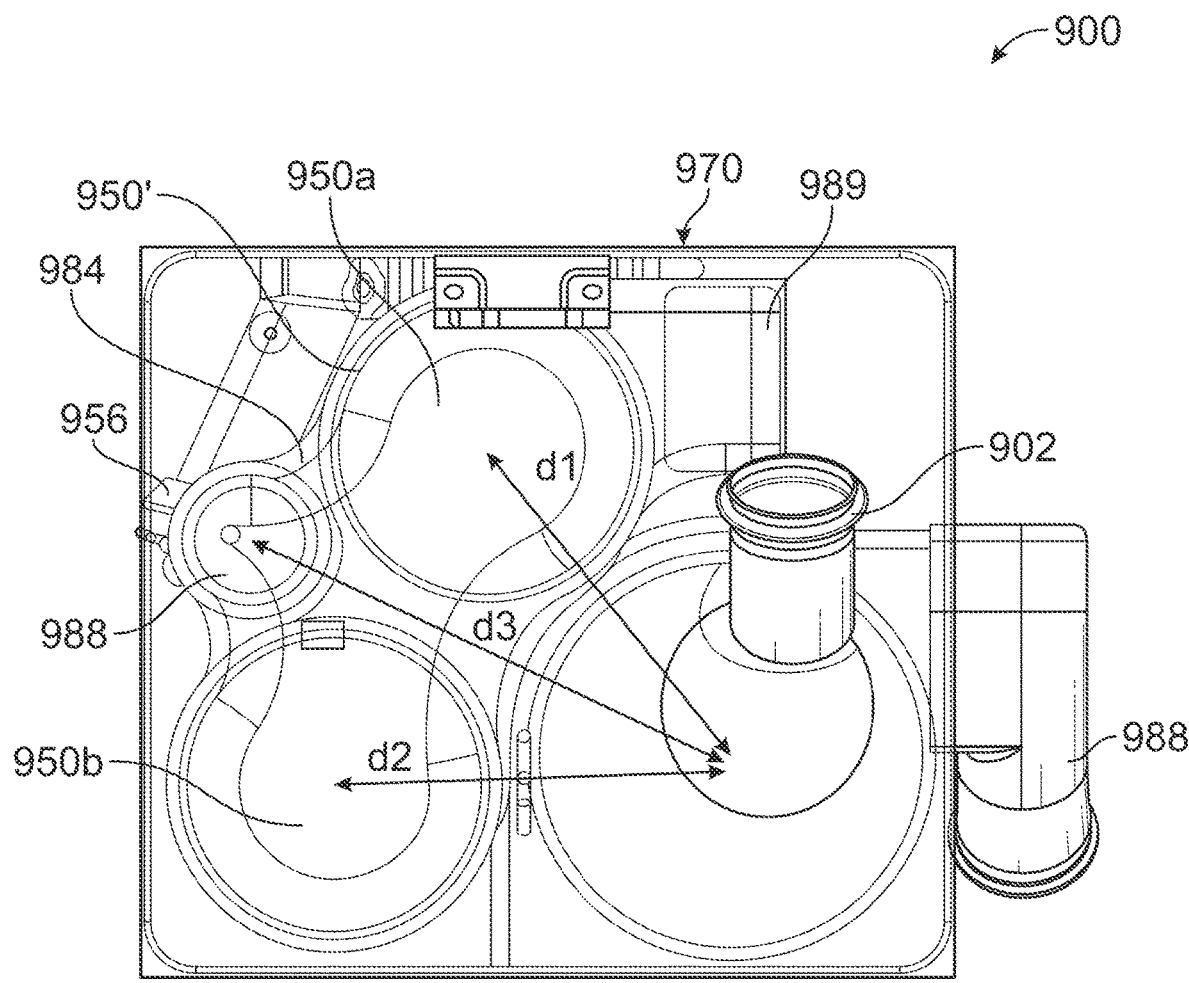
FIG. 16 is a front view of the aftertreatment system of FIG. 15.
Figure 17:
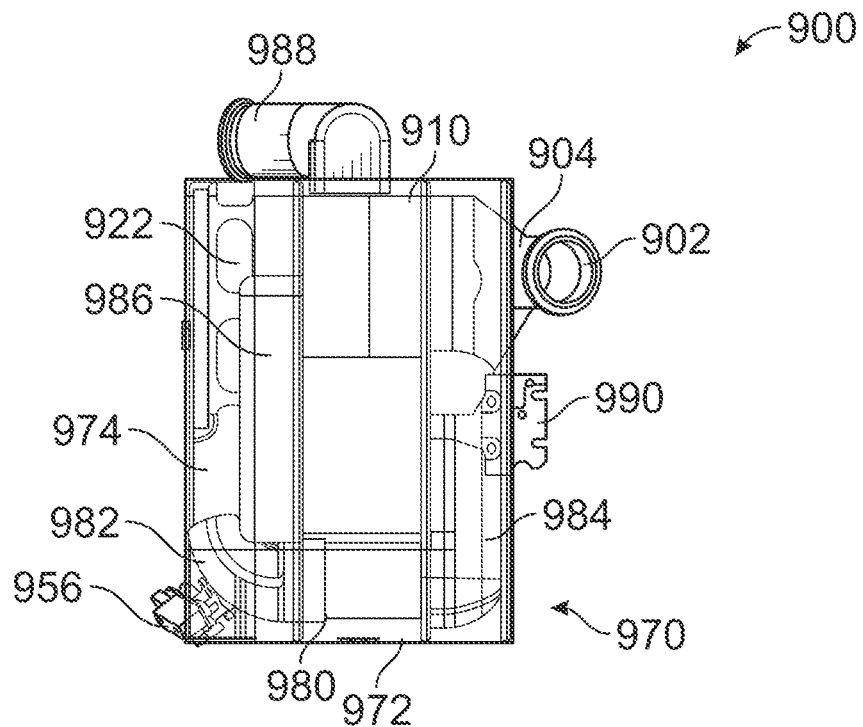
FIG. 17 is a top view of the aftertreatment system of FIG. 15.
Figure 18:
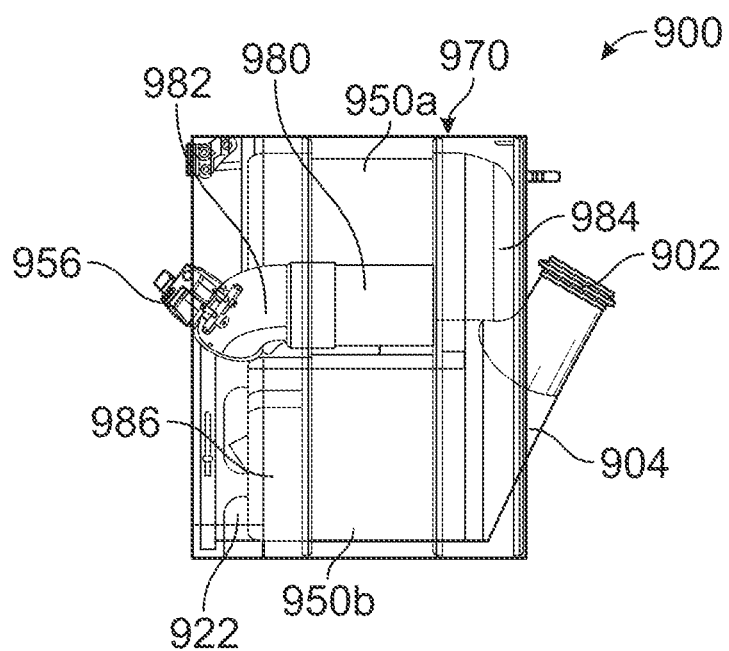
FIG. 18 is a left side view of the aftertreatment system of FIG. 15.

The decomposition tube 980 extends from the second internal volume 974 to the first internal volume 972 along an axis that is parallel to and offset from each of the first axis $A_{L1}$, the first SCR axis $A_{SCR1}$, and the second SCR axis $A_{SCR2}$. As shown in FIG. 16, a linear distance d3 from the first axis $A_{L1}$ to the axis of the decomposition tube 980 is greater than the first linear distance d1 and the second linear distance d2. In other words, the decomposition tube 980 is located at a greater distance from the first aftertreatment leg 910' relative to the first SCR catalyst 950a and the second SCR catalyst 950b.

An inlet 982 of the decomposition tube 980 is disposed in the second internal volume 974 such that the decomposition tube 980 is configured to receive the exhaust gas emitted into the second internal volume 974, and communicate the exhaust gas from the second internal volume 974 to the inlet of the SCR catalysts 950a and 950b in the first internal volume. In some embodiments, the inlet 982 of decomposition tube 980 is oriented at an angle that is perpendicular to the axis of the decomposition tube 980 such that the decomposition tube 980 forms an elbow tube. The inlet 982 is located proximate to the outlet 922 of the filter 920. A reductant injection inlet is defined proximate to the inlet 982 of the decomposition tube 980 and configured to allow reductant to be injected into the decomposition tube 982. A reductant injector 956 is mounted on the decomposition tube 980 proximate to the inlet 982 of the decomposition tube 980 and configured to insert a reductant into the decomposition tube 980 via the reductant injection inlet. For example, the reductant injector 956 may be mounted on a bend defined in the decomposition tube 980 downstream of the inlet 982.

The aftertreatment system 900 further comprises a SCR inlet plenum 984 disposed in the first internal volume 972 and fluidly coupled to respective inlets of each of the first SCR catalyst 950a, and the second SCR catalyst 950b. An outlet of the decomposition tube 980 is fluidly coupled to the SCR inlet plenum 984. The decomposition tube 980 receives exhaust gas from the second internal volume 974 and communicates the exhaust gas to the SCR inlet plenum 984 in a second direction that is substantially opposite the first direction. The SCR inlet plenum 984 is configured to redirect exhaust gas flowing therein towards respective inlets of each of the two SCR catalysts 950a and 950b such that the exhaust gas flows in a third direction through the second aftertreatment leg 950'. The third direction is opposite the second direction, i.e., in the same direction as the first direction.

An SCR outlet plenum 986 is disposed in the second internal volume 974 and coupled to respective outlets of each of the SCR catalysts 950a and 950b. The SCR outlet plenum 985 defines an outlet 989 that is fluidly coupled to the first internal volume 972 and configured to release treated exhaust gas into the first internal volume 972. An outlet conduit 988 is coupled to a sidewall of the housing 970 forming the first internal volume 972 and is configured to expel the treated exhaust gas that is communicated into the first internal volume 972 via the SCR outlet plenum 986, into the environment. A groove 991 is defined in a sidewall of the SCR outlet plenum 986 that is perpendicular to the first and second SCR axes $A_{SCR1}$ and $A_{SCR2}$ of the two SCR catalysts 950a and 950b, respectively. A portion of the inlet 982 of the decomposition tube 980 is disposed in the groove 991.

Figure 19:
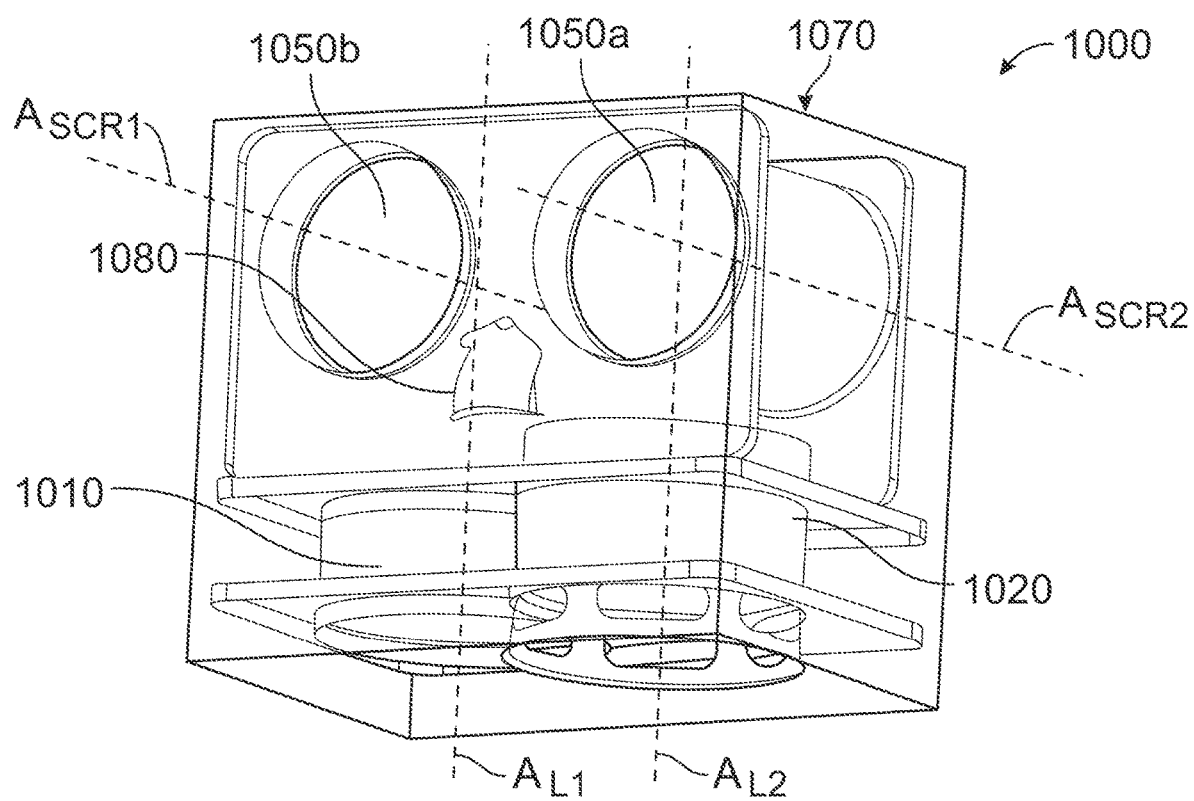
FIG. 19 is a bottom, rear, left side perspective view of an aftertreatment system, according to an embodiment.
Figure 20:
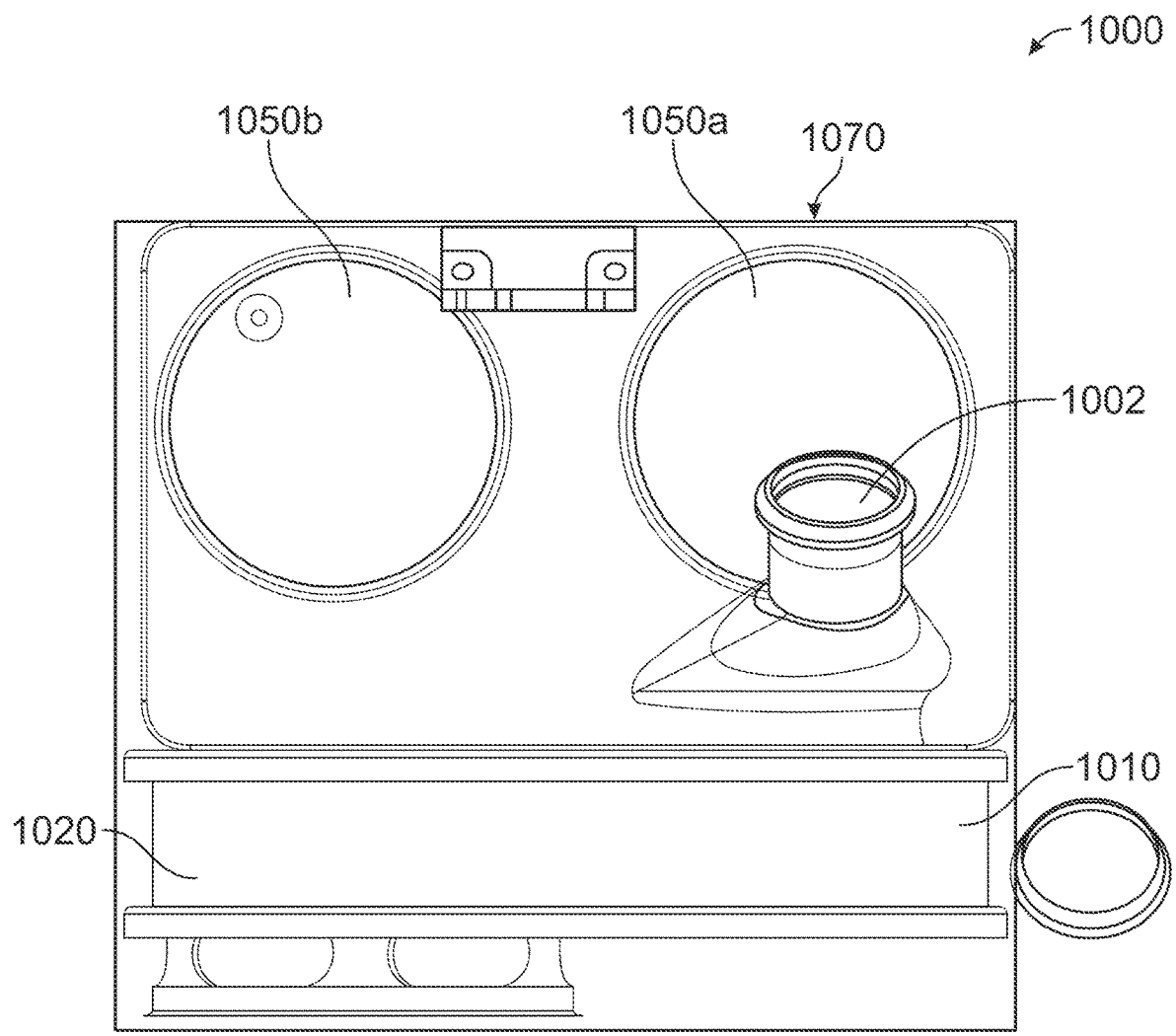
FIG. 20 is a front view of the aftertreatment system of FIG. 19.

FIGS. 19-20 show different views of an aftertreatment system 1000, according to an embodiment. The aftertreatment system 1000 includes a housing 1070 within which an oxidation catalyst 1010, a filter 1020, a first SCR catalyst 1050a, and a second SCR catalyst 1050b are disposed. The housing 1070 may be divided into two or more internal volumes that may be fluidly isolated from each other. The oxidation catalyst 1010 extends along a first axis $A_{L1}$ that is parallel to a major axis of the housing 1070 (e.g., extends along a longest dimension of the housing 1070). An inlet conduit 1002 is fluidly coupled to the oxidation catalyst 1010 and configured to communicate exhaust gas to the oxidation catalyst 1010. The filter 1020 extends along a second axis $A_{L2}$ that is parallel to the first axis $A_{L1}$ and horizontally offset therefrom. Different from the aftertreatment systems 700, 800, and 900, the first SCR catalyst 1050a and the second SCR catalyst 1050b extends along a first SCR axis $A_{SCR1}$ and a second SCR axis $A_{SCR2}$, respectively, that are perpendicular to the first axis $A_{L1}$ and the second axis $A_{L2}$. For example, the first and second SCR axis $A_{SCR1}$ and $A_{SCR2}$ may be parallel to a minor axis of the housing 1070 (e.g., extend along a shortest dimension of the housing 1070). A decomposition tube 1080 may be disposed in a direction parallel to the first SCR axis $A_{SCR1}$ and the second SCR axis $A_{SCR2}$, and configured to communicate exhaust gas from the filter 1020 to the first and second SCR catalysts 1050a and 1050b.

FIGS. 21-24 are various views of an aftertreatment system 1100 for treating constituents of an exhaust gas (e.g., diesel gas), according to still another embodiment. The aftertreatment system 1100 includes a housing 1170 defining a first internal volume 1172 and a second internal volume 1174 that is fluidly isolated from the first internal volume 1172. For example, a plate 1173 may extend along a major axis of the housing 1170 and divides the housing 1170 into the first internal volume 1172 and the second internal volume 1174. In other embodiments, an inner housing may be disposed inside the housing 1170 and define an inner housing internal volume that is isolated from the internal volume of the housing 1170. Mounting brackets 1190 or other mounting features may be provided on the housing 1170 to allow the housing 1170 to be mounted on a structure (e.g., a vehicle chassis). The aftertreatment system 1100 includes a first aftertreatment leg 1110', a second aftertreatment leg 1150', and a decomposition tube 1180 disposed within the housing 1170.

The first aftertreatment leg 1110' extends from the first internal volume 1172 to the second internal volume 1174 in a direction parallel to a minor axis of the housing 1170. For example, the first aftertreatment leg 1110' may extend along a shortest dimension of the housing 1170. Corresponding openings may be defined in the plate 1173 to allow the first aftertreatment leg 1110' to extend from the first internal volume 1172 to the second internal volume 1174. Additional plates may also be disposed parallel to the plate 1173, and may serve as brackets to support the first aftertreatment leg 1110', the second aftertreatment leg 1150', and the decomposition tube 1180.

The first aftertreatment leg 1110' extends from the first internal volume to the second internal volume and includes a first segment extending along a first axis $A_{L1}$ that is parallel to a minor axis of the housing 1170 and a second segment that extends along a second axis $A_{L2}$ that is parallel to the first axis $A_{L1}$. The first segment includes a first oxidation catalyst 1110a and a first filter 1120a disposed downstream of the first oxidation catalyst 1110a and axially aligned with the first oxidation catalyst 1110a. An outlet of the first filter 1120a is disposed in the second internal volume. The second segment includes a second oxidation catalyst 1110b disposed parallel to the first oxidation catalyst 1110a and horizontally aligned with the first oxidation catalyst 1110a. A second filter 1120b is disposed downstream of the second oxidation catalyst 1110b and axially aligned with second oxidation catalyst 1110b. Each of the first oxidation catalyst 1110a and the second oxidation catalyst 1110b may have a diameter in a range of 240 mm to 280 mm, inclusive and a length in range of 70 mm to 120 mm, inclusive. Moreover, each of the first filter 1120a and the second filter 1120b may have a diameter in a range of 240 mm to 280 mm, inclusive, and a length in a range of 110 mm to 150 mm, inclusive.

A first aftertreatment leg inlet plenum 1106 is disposed in the first internal volume 1172. The first aftertreatment leg inlet plenum 1106 is coupled to an inlet of each of the first oxidation catalyst 1110a and the second oxidation catalyst 1110b, and to an inlet conduit 1102. The first aftertreatment leg inlet plenum 1106 is configured to communicate a first portion of the exhaust gas to the first oxidation catalyst 1110a and a second portion of the exhaust gas to the second oxidation catalyst 1110b. In some embodiments, the inlet conduit 1102 comprises an inlet cone 1104 that has a constantly expanding cross-section from an upstream end to a downstream end of the inlet conduit 1102, as described with respect to the inlet conduit 702, 802, 902.

The first filter 1120a is configured to emit the first portion of the exhaust gas via a first filter outlet 1122a and the second filter 1120b is configured to emit the second portion of the exhaust gas via a second filter outlet 1122b into the second internal volume, respectively. Each of the first filter outlet 1122a and second filter outlet 1122b include a plurality of circumferential slits defined in respective housings of the filters 1120a and 1120b at respective ends thereof that is located in the second internal volume 1174. Exhaust gas flows in a first direction through the first aftertreatment leg 1110' and is released into the second internal volume 1174.

The second aftertreatment leg 1150' includes two SCR catalyst, a first SCR catalyst 1150a extending along a first SCR axis $A_{SCR1}$ and a second SCR catalyst 1150b extending along a second SCR axis $A_{SCR2}$. The first SCR catalyst 1150a and the second SCR catalyst 1150b are disposed parallel to each other and are horizontally aligned with each other. In some embodiments, the first SCR catalyst 1150a is disposed parallel to and vertically aligned with the first oxidation catalyst 1110a. Moreover the second SCR catalyst 1150b is disposed parallel to and vertically aligned with the second oxidation catalyst 1110b. Each of the SCR catalysts 1150a and 1150b may have a diameter in a range of 240 mm to 280 mm, inclusive, and a length in a range of 220 mm to 260 mm, inclusive.

Figure 21:
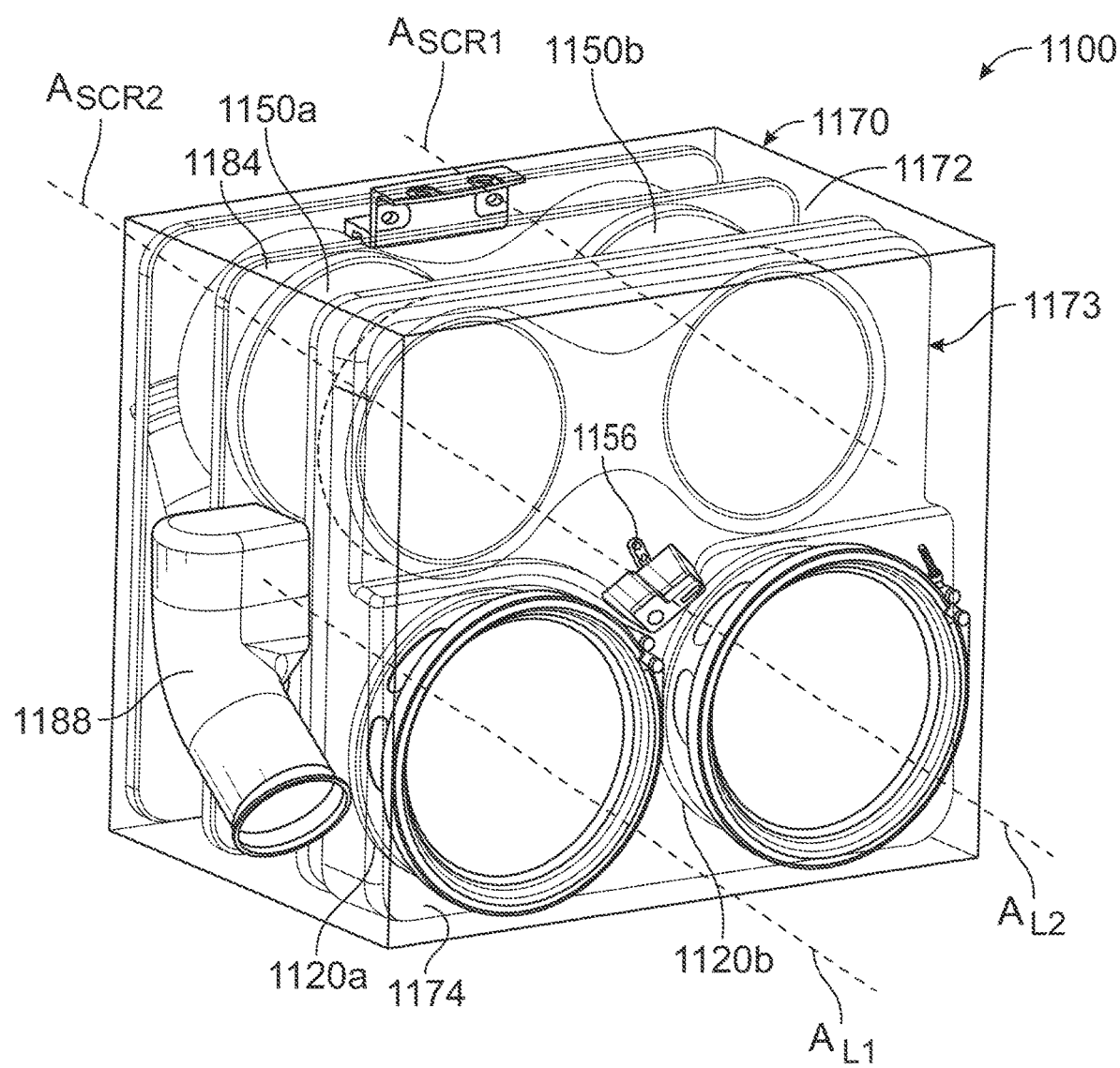
FIG. 21 is a top, rear, left side perspective view of an aftertreatment system, according to an embodiment.
Figure 22:
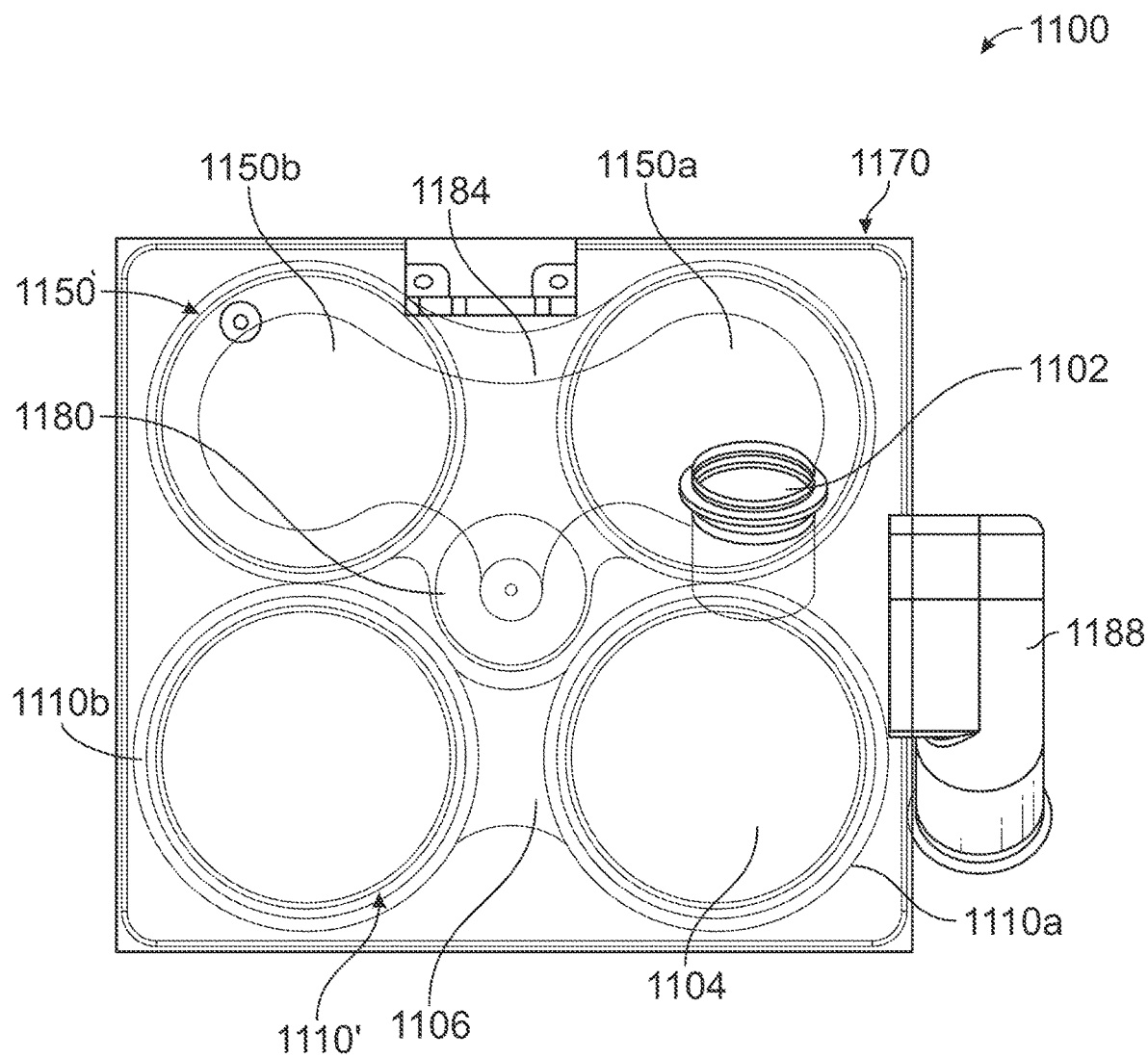
FIG. 22 is a front view of the aftertreatment system of FIG. 21.
Figure 23:
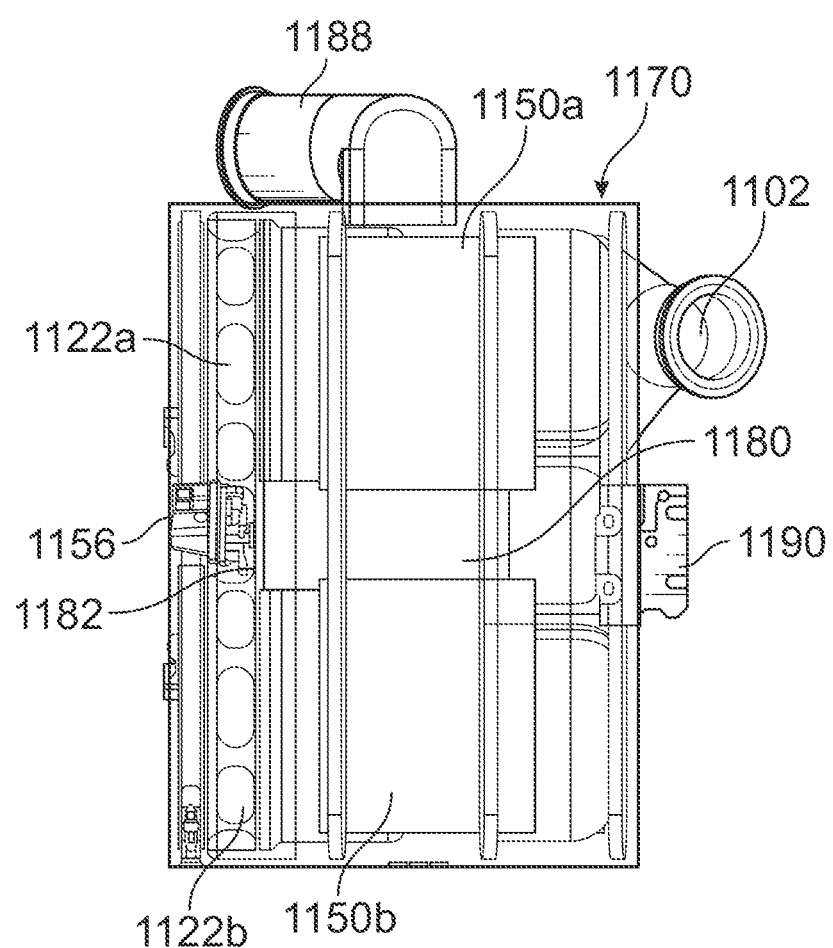
FIG. 23 is a top view of the aftertreatment system of FIG. 21.
Figure 24:
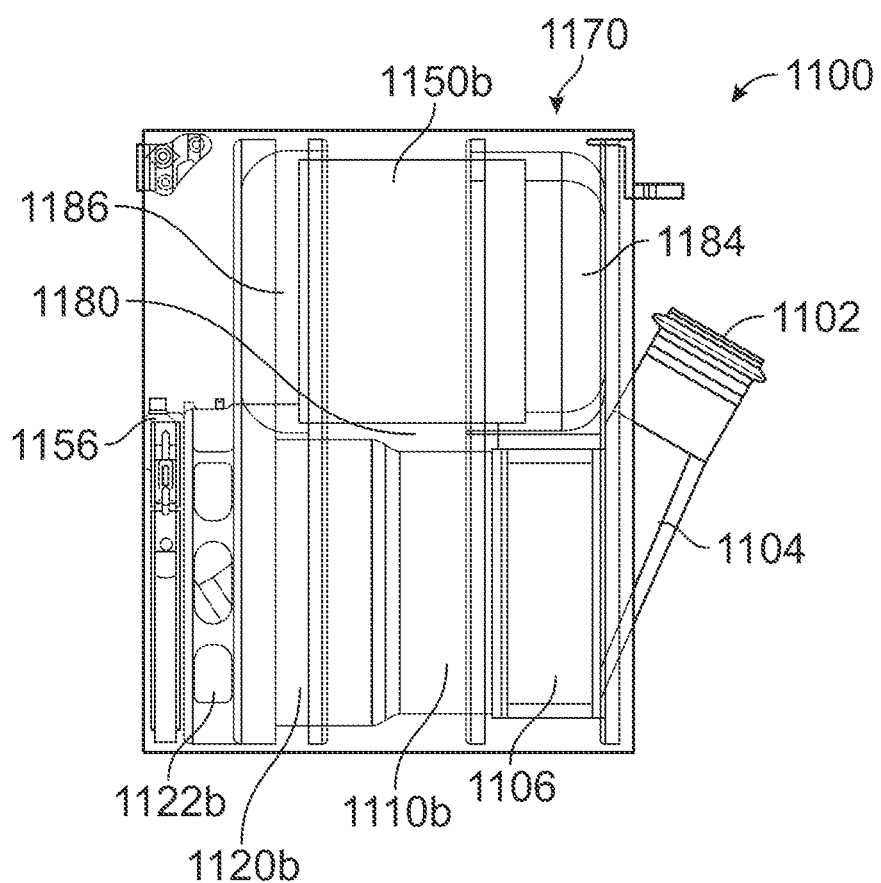
FIG. 24 is a left side view of the aftertreatment system of FIG. 21.

A decomposition tube 1180 is disposed within the housing 1170 from the second internal volume 1174 to the first internal volume 1172 and extends along an axis that is parallel to and offset from each of the first axis $A_{L1}$, the second axis $A_{L2}$, the first SCR axis $A_{SCR1}$, and the second SCR axis $A_{SCR2}$. An inlet of the decomposition tube 1180 is disposed in the second internal volume 1174 and configured to receive each of the first portion and the second portion of the exhaust gas from the second internal volume, and communicate the exhaust gas from the second internal volume 1174 to inlets of the SCR catalysts 1150a and 1150b in the first internal volume. An inlet of the decomposition tube 1180 may be located proximate to the outlets 1022a and 1022b of the filters 1020a and 1020b, respectively. A reductant injection inlet is defined proximate to the inlet 1182 of the decomposition tube 1180 and configured to allow reductant to be injected into the decomposition tube 1180. A reductant injector 1156 is mounted on the decomposition tube 1180 proximate to the inlet of the decomposition tube 1180 and configured to insert a reductant into the decomposition tube 1180 via the reductant injection inlet. As shown in FIGS. 21-22 the decomposition tube 1180 is disposed proximate to a central portion of the housing 1170 such that the decomposition tube 1180 is surrounded by the first aftertreatment leg 1110' and the second aftertreatment leg 1150'.

The aftertreatment system 1100 further comprises a SCR inlet plenum 1184 disposed in the first internal volume 1172 and fluidly coupled to respective inlets of each of the first SCR catalysts 1150a, and the second SCR catalyst 1150b. The SCR inlet plenum 1184 is configured to redirect exhaust gas flowing therein towards respective inlets of each of the two SCR catalysts 1150a and 1150b. An outlet of the decomposition tube 1180 is fluidly coupled to the SCR inlet plenum 1184. The decomposition tube 1180 receives exhaust gas from the second internal volume 1174 and communicates the exhaust gas to the SCR inlet plenum 1184 in a second direction that is substantially opposite the first direction. The SCR inlet plenum 1184 is configured to redirect exhaust gas flowing therein towards respective inlets of each of the two SCR catalysts 1150a and 1150b such that the exhaust gas flows in a third direction through the second aftertreatment leg 1150'. The third direction is opposite the second direction, i.e., in the same direction as the first direction.

An SCR outlet plenum 1186 is disposed in the second internal volume 1174 and coupled to respective outlets of each of the SCR catalysts 1150a and 1150b. The SCR outlet plenum 1186 may define an outlet that is fluidly coupled to the first internal volume 1172 and configured to release treated exhaust gas into the first internal volume 1172. An outlet conduit 1188 is coupled to a sidewall of the housing 1170 forming the first internal volume 1172 and is configured to expel the treated exhaust gas that is communicated into the first internal volume 1172 via the SCR outlet plenum 1186, into the environment.

FIGS. 25-36 are various views of an aftertreatment system 1200 for treating constituents of an exhaust gas (e.g., diesel gas), according to yet another embodiment. The aftertreatment system 1200 includes a housing 1270 defining a first internal volume 1272 and a second internal volume 1274 that is fluidly isolated from the first internal volume 1272. For example, a plate 1273 may extend along a major axis of the housing 1270 and divides the housing 1270 into the first internal volume 1272 and the second internal volume 1274. In other embodiments, an inner housing may be disposed inside the housing 1270 and defines an inner housing internal volume that is isolated from the internal volume of the housing 1270. Mounting brackets 1290 or other mounting features may be provided on the housing 1270 to allow the housing 1270 to be mounted on a structure (e.g., a vehicle chassis). The aftertreatment system 1200 includes a first aftertreatment leg 1210', a second aftertreatment leg 1220', a third aftertreatment leg 1250', and a decomposition tube 1280 disposed within the housing 1270.

The first aftertreatment leg 1210' extends from the first internal volume 1272 to the second internal volume 1274 in a direction parallel to a minor axis of the housing 1270. For example, the first aftertreatment leg 1210' may extend along a shortest dimension of the housing 1270. Corresponding openings may be defined in the plate 1273 to allow the first aftertreatment leg 1210' to extend from the first internal volume 1272 to the second internal volume 1274. Additional plates may also be disposed parallel to the plate 1273, and may serve as brackets to support the first aftertreatment leg 1210', the second aftertreatment leg 1220', the third aftertreatment leg 1250' and the decomposition tube 1280.

Figure 29:
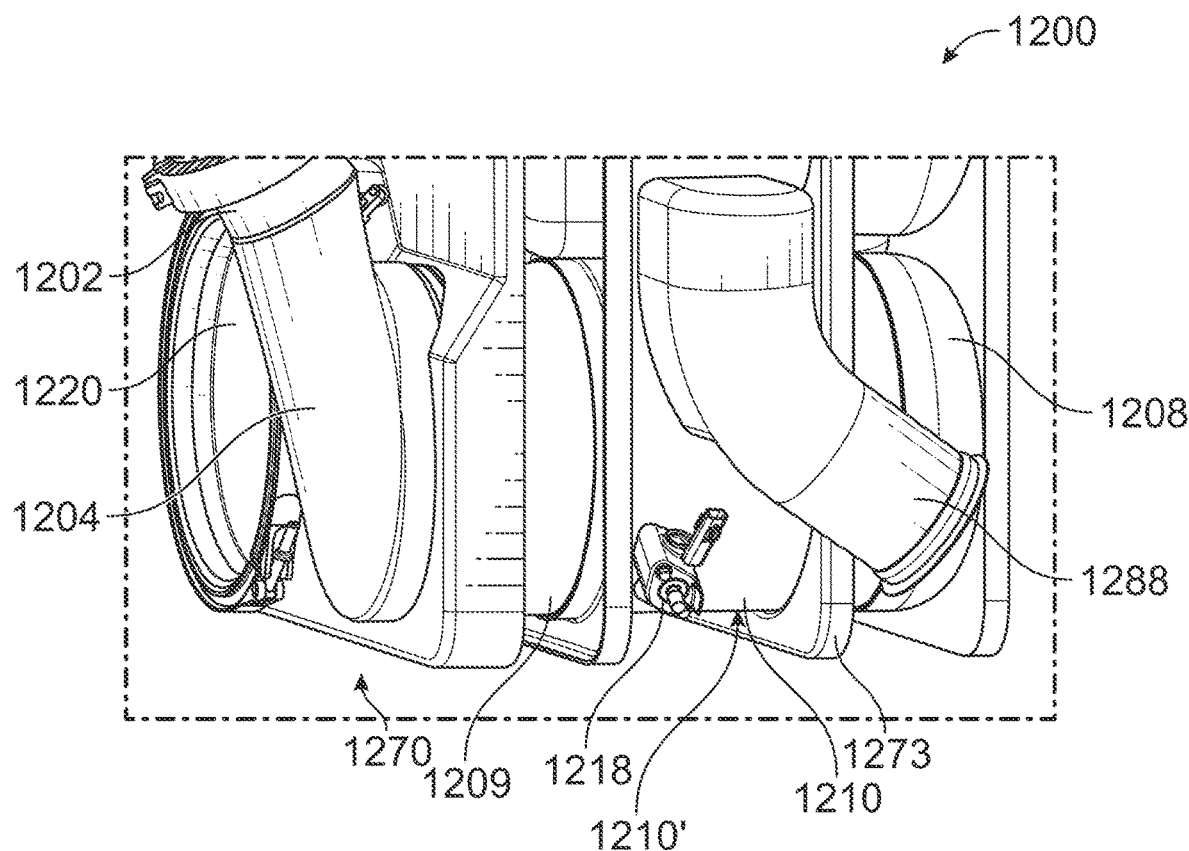
FIG. 29 is front, left side perspective view of a portion of the aftertreatment system of FIG. 25.
Figure 33:
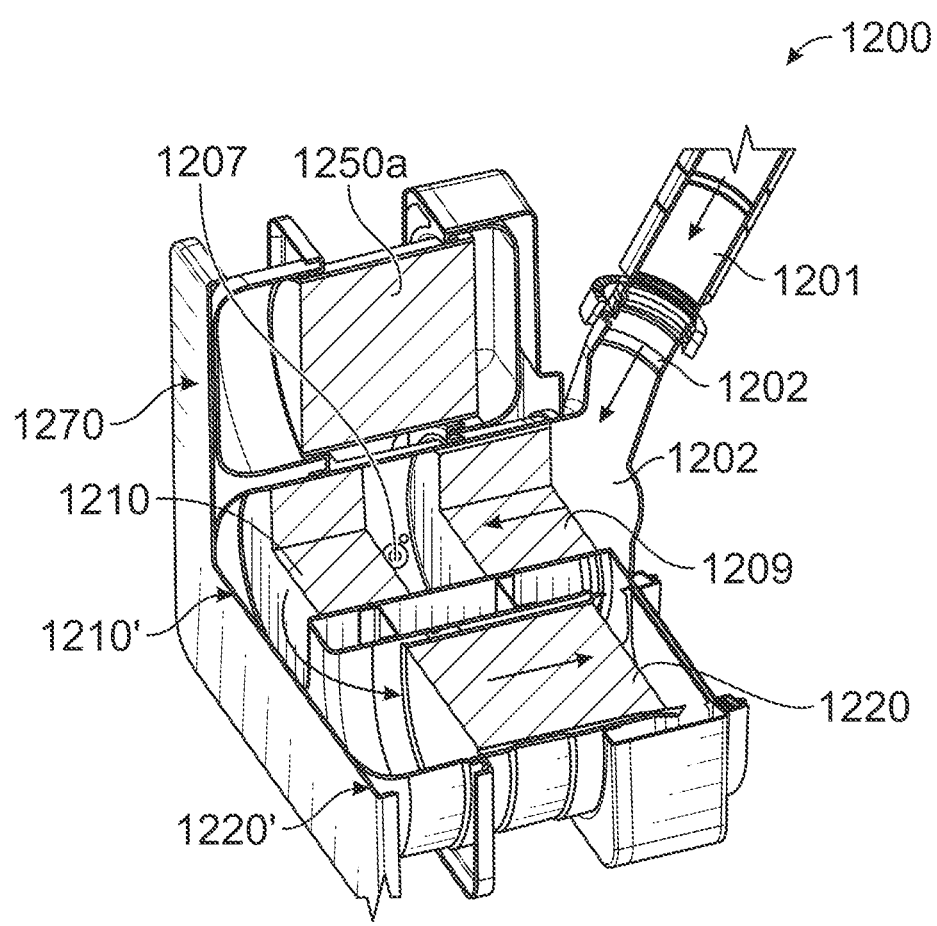
FIG. 33 is a cross-section view of the aftertreatment system of FIG. 25 taken along the line X-X shown in FIG. 26 and with a housing of the aftertreatment system removed to show the various aftertreatment components included therein.
Figure 34:
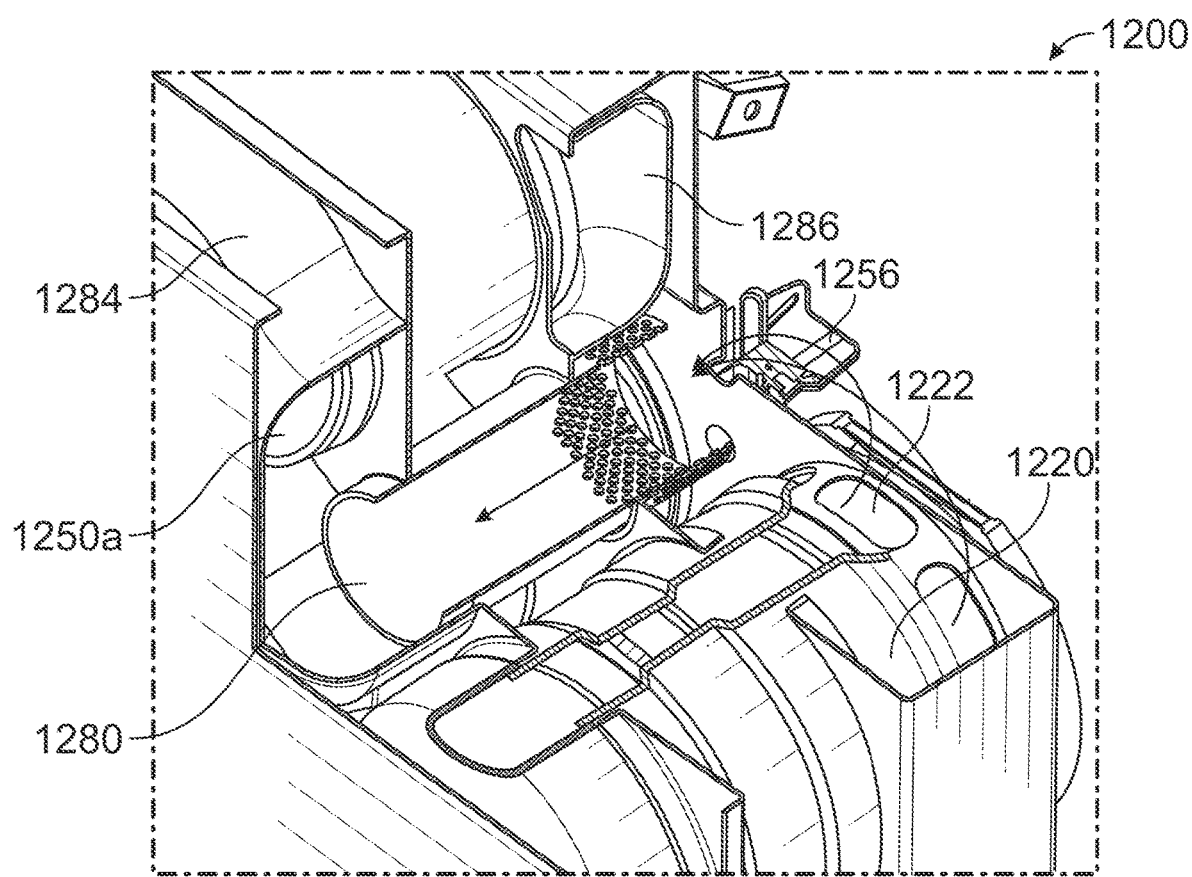
FIG. 34 is another cross-section view of the aftertreatment system of FIG. 25 showing a decomposition tube disposed therein.
Figure 35:
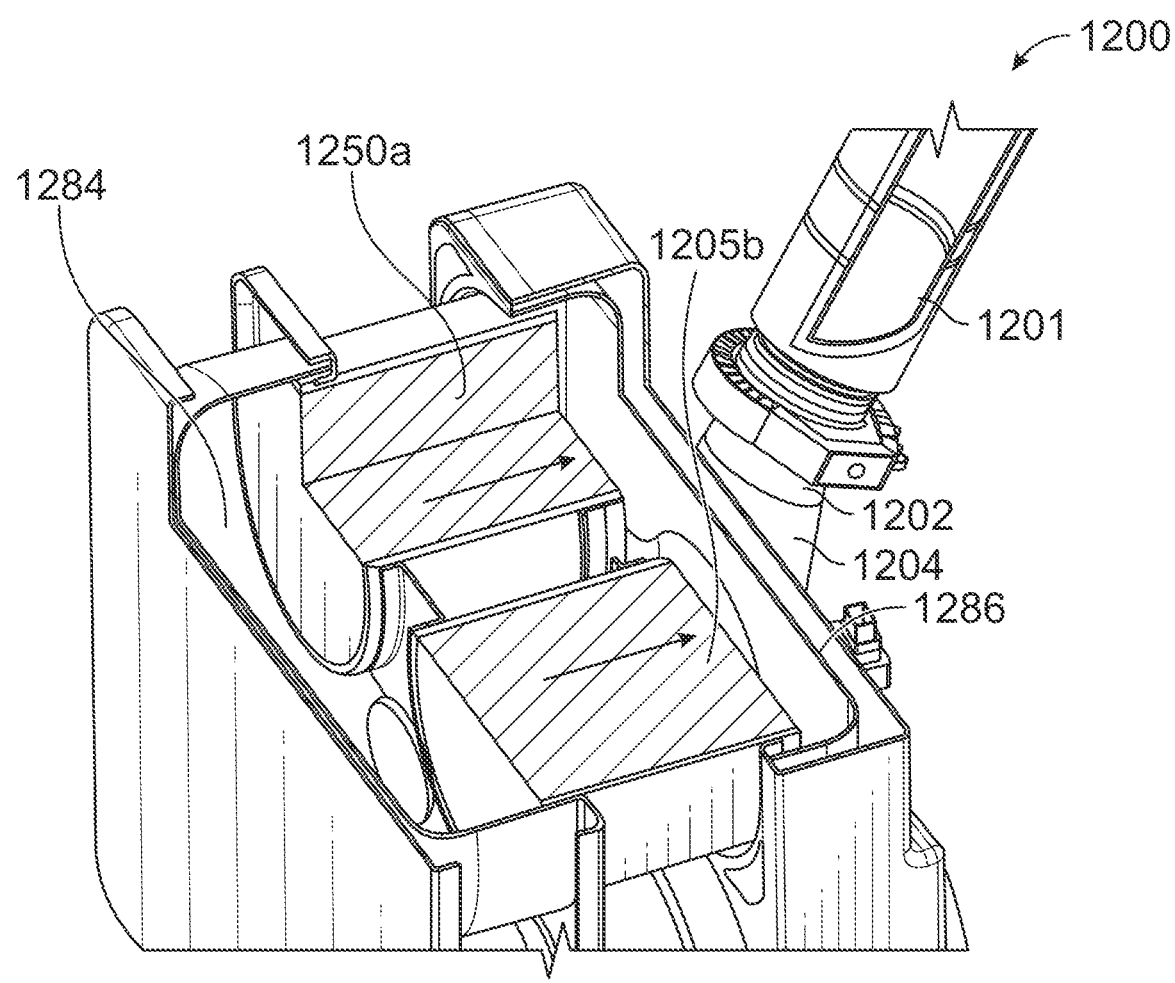
FIG. 35 is another cross-section view of the aftertreatment system of FIG. 25 with the housing of the aftertreatment system removed.
Figure 36:
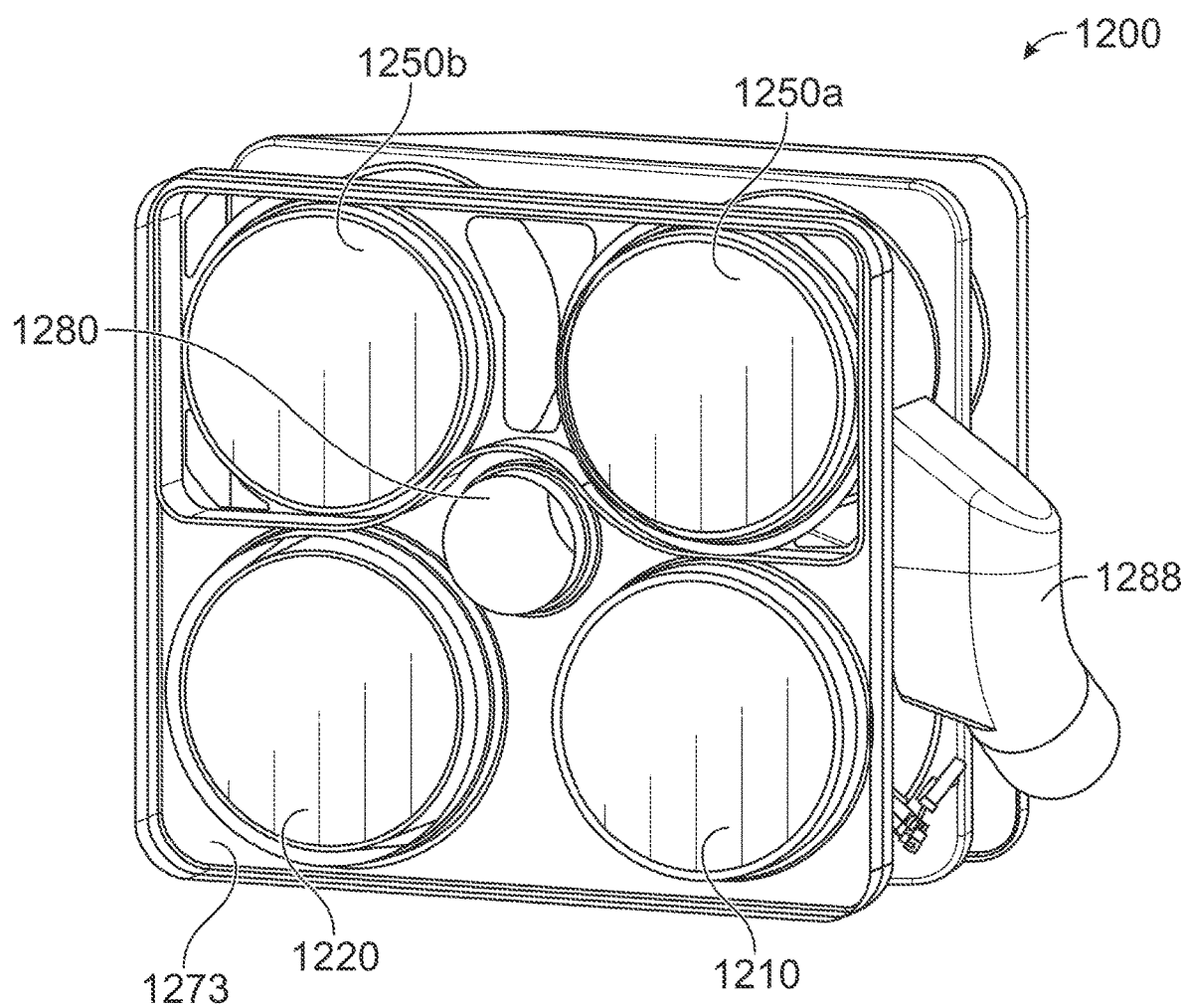
FIG. 36 is a rear, top, left perspective view of the aftertreatment system of FIG. 25 with the housing of the aftertreatment system removed.

As shown in FIGS. 29 and 33, the first aftertreatment leg 1210' includes a temperature control aftertreatment component 1209 extending along a first axis $A_{L1}$ that is parallel to a minor axis of the housing 1270. The first aftertreatment leg 1210' is configured to receive the exhaust gas via an inlet conduit 1202 fluidly coupled to the temperature control aftertreatment component 1209. In some embodiments, the inlet conduit 1202 comprises an inlet cone 1204 that has a constantly expanding cross-section from an upstream end to a downstream end of the inlet conduit 1202, as described with respect to the inlet conduit 702, 802, 902, 1102.

An oxidation catalyst 1210 is disposed downstream of the temperature control aftertreatment component 1209 and axially aligned with the temperature control aftertreatment component 1209. In some embodiments, a hydrocarbon injector 1218 is disposed on the first aftertreatment leg 1210' between the temperature control aftertreatment component 1209 and the oxidation catalyst 1210. The hydrocarbon injector 1218 is mounted on a hydrocarbon injection inlet 1207 (FIG. 33) and configured to insert hydrocarbons into the exhaust gas for increasing temperature of the exhaust gas (e.g., to regenerate a downstream filter 1220 or SCR catalysts 1150a and 1150b) as the oxidation catalyst 1210 catalyzes the combustion of the hydrocarbons. An outlet of the oxidation catalyst 1210 is disposed in the second internal volume 1274. Each of the temperature control aftertreatment component 1209 and the oxidation catalyst 1210 may have a diameter in a range of 250 mm to 300 mm, inclusive and a length in a range of 130 mm to 170 mm, inclusive.

In some embodiments, the temperature control aftertreatment component 1209 may include a vSCR catalyst. The vSCR catalyst may be configured to catalyze decomposition of constituents of the exhaust gas (e.g., $NO_x$ gases) in the presence of a reductant in an exothermic reaction, which increases a temperature of the exhaust gas. This may be beneficial during cold start operation of the aftertreatment system 1200 because the temperature of the exhaust gas may increase after passing through the vSCR thereby, causing a temperature of the downstream oxidation catalyst 1210 and SCR catalysts 1250a and 1250b to increase. In such embodiments, a mixing tube 1201 may be disposed upstream of the inlet conduit 1202. A first reductant injector 1206 may be disposed on the mixing tube 1201, for example, at an end thereof that is opposite to an end which is coupled to the inlet conduit 1202, and configured to insert a reductant into the exhaust gas. The mixing tube 1201 may have a sufficient length or include internal structures (e.g., baffle plates, veins, blades, etc.) to facilitate mixing of the reductant with the exhaust gas. In other embodiments, the temperature control aftertreatment component 1209 may include a heater (e.g., a 10 kW electric heater) configured to selectively heat the exhaust gas flowing into the oxidation catalyst 1210. In such embodiments, the mixing tube 1201 and the first reductant injector 1206 may be excluded.

A second aftertreatment leg 1220' extends from the second internal volume 1274 to the first internal volume 1272 parallel to the first aftertreatment leg 1210' and horizontally aligned with the first aftertreatment leg 1210'. The second aftertreatment leg includes a filter 1220 disposed parallel to the oxidation catalyst 1210 and extending along a second axis $A_{L2}$ that is parallel to and offset from the first axis $A_{L1}$. The filter 1220 is configured to receive exhaust gas from the oxidation catalyst 1210 through the second internal volume 1274. An outlet of the filter 1220 is disposed within the first internal volume 1272 and configured to emit exhaust gas into the first internal volume 1272 after passing through the filter 1220. The filter may have a diameter in a range of 250 mm to 300 mm, inclusive and a length in a range of 220 mm to 280 mm, inclusive. The aftertreatment system 1200 includes a transition plenum 1208 fluidly coupling the outlet of the oxidation catalyst 1210 to an inlet of the filter 1220. The exhaust gas flows through the first aftertreatment leg 1210' in a first direction, and then through the second aftertreatment leg 1220' in a second direction that is opposite the first direction.

The third aftertreatment leg 1250' includes two SCR catalyst, a first SCR catalyst 1250a extending along a first SCR axis $A_{SCR1}$ and a second SCR catalyst 1250b extending along a second SCR axis $A_{SCR2}$. The first SCR catalyst 1250a and the second SCR catalyst 1250b are disposed parallel to offset from each other. In some embodiments, the first SCR catalyst 1250a is disposed parallel to the first aftertreatment leg 1210'. Moreover the second catalyst 1250b is disposed parallel to the second aftertreatment leg 1220'. Each of the SCR catalysts 1250a and 1250b may have a diameter in a range of 250 mm to 300 mm, inclusive and a length in a range of 220 mm to 260 mm, inclusive.

Figure 25:
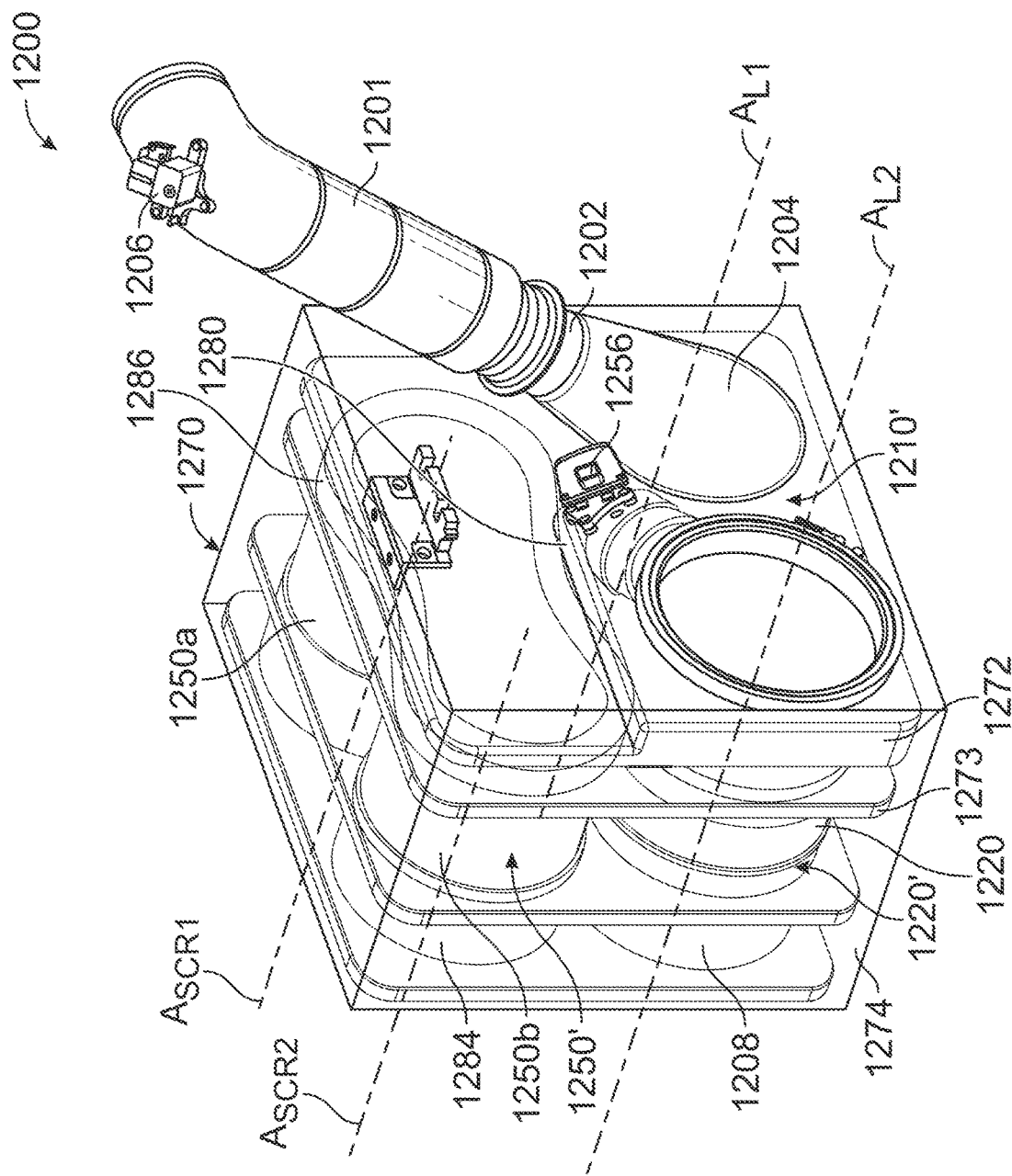
FIG. 25 is a top, front, left side perspective view of an aftertreatment system, according to an embodiment.
Figure 26:
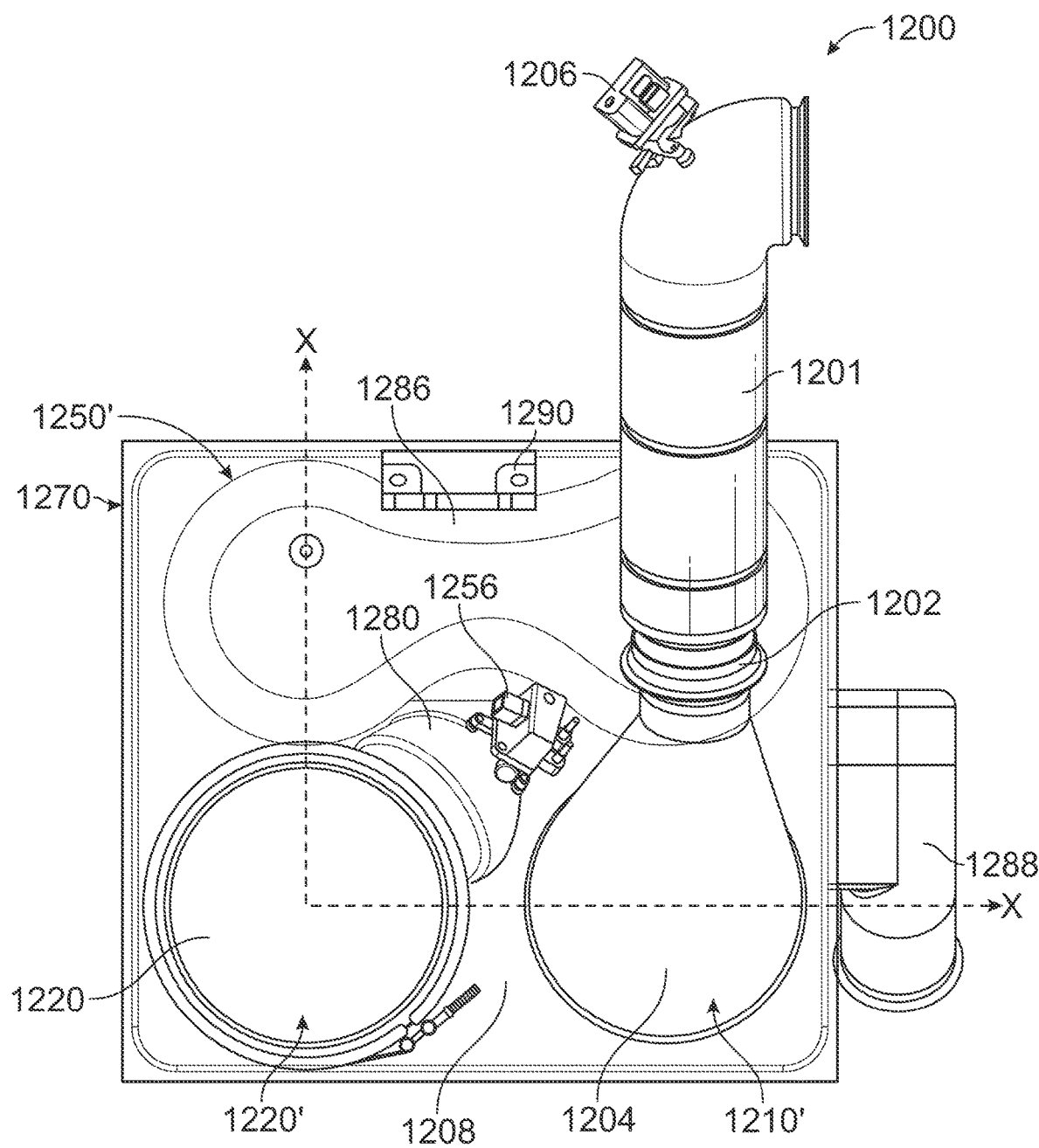
FIG. 26 is a front view of the aftertreatment system of FIG. 25.
Figure 27:
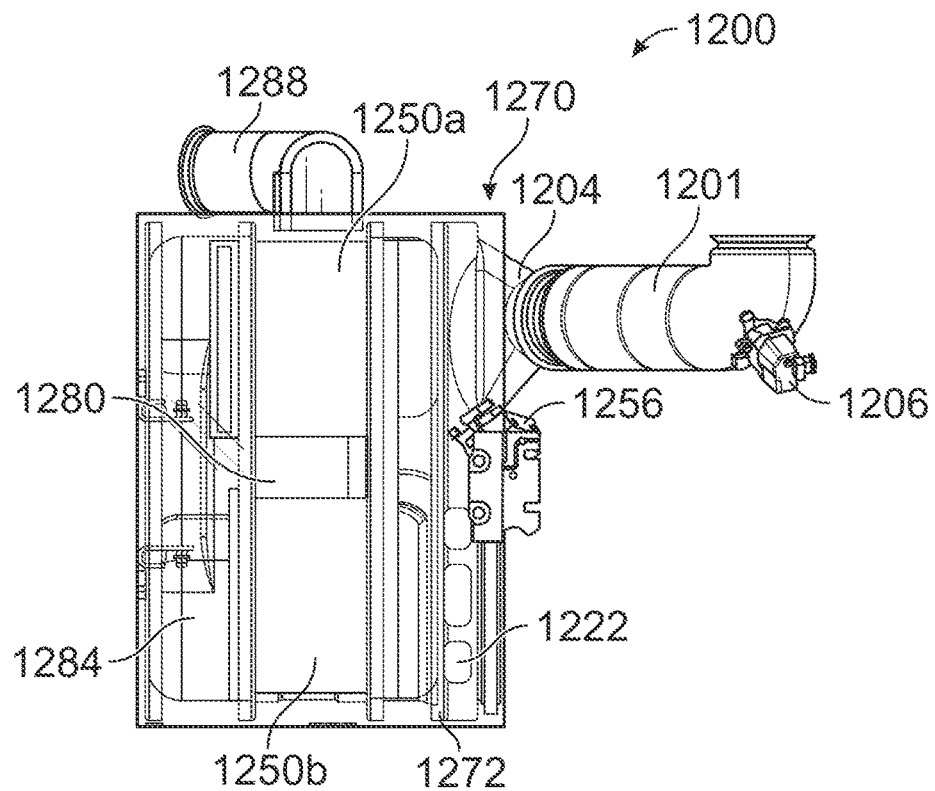
FIG. 27 is a top view of the aftertreatment system of FIG. 25.
Figure 28:
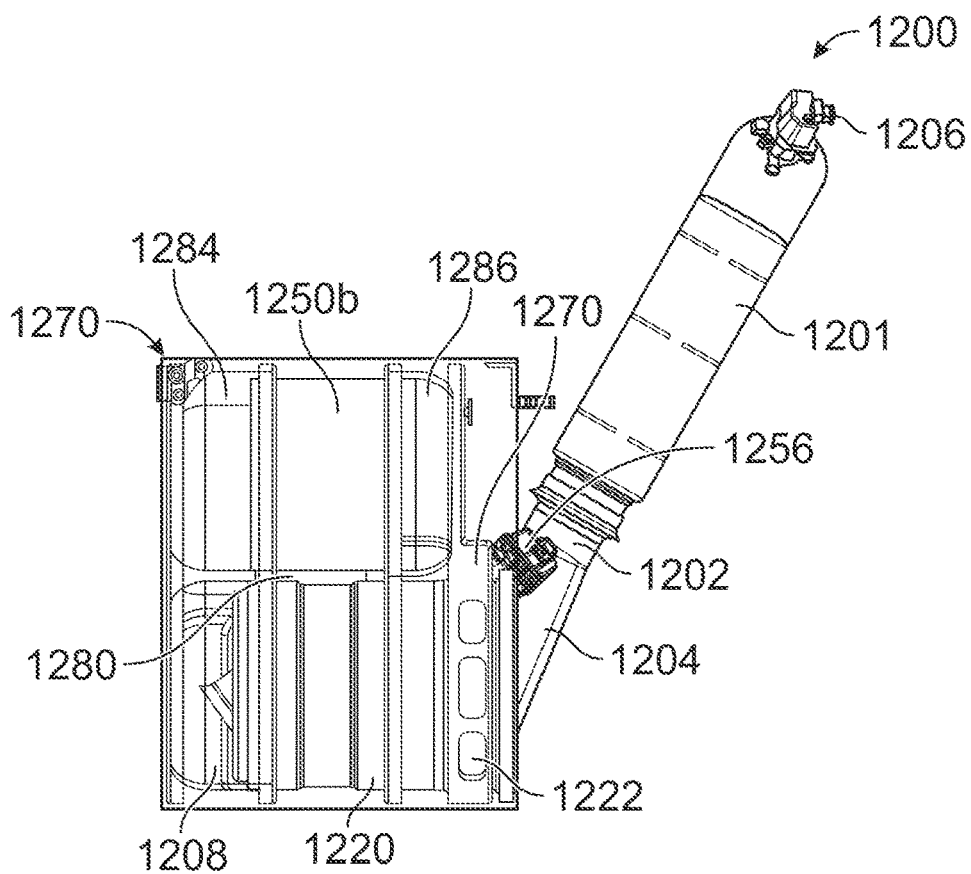
FIG. 28 is a left side view of the aftertreatment system of FIG. 25.
Figure 30:
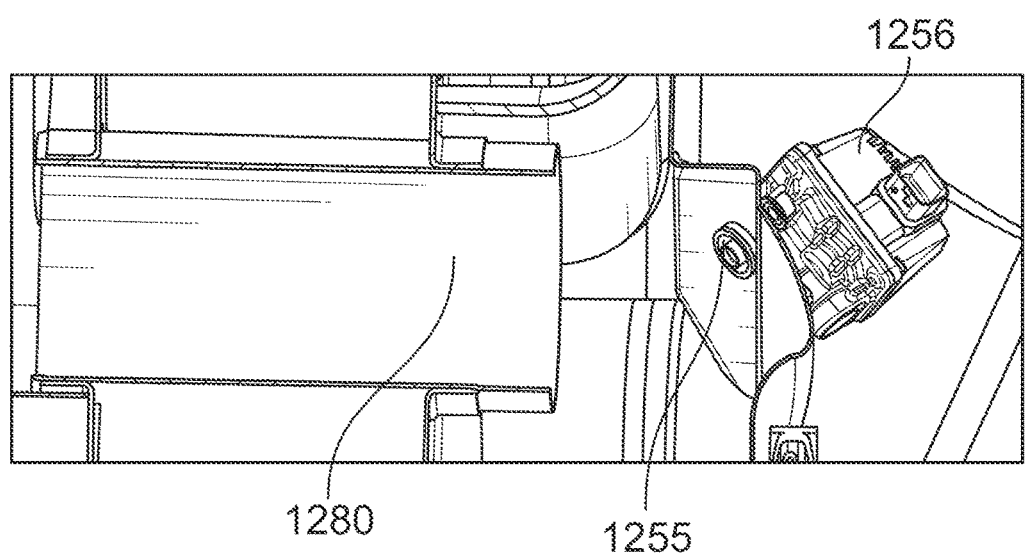
FIG. 30 is a cross-section view of a portion of the aftertreatment system of FIG. 25 showing a decomposition tube disposed therein.
Figure 31:
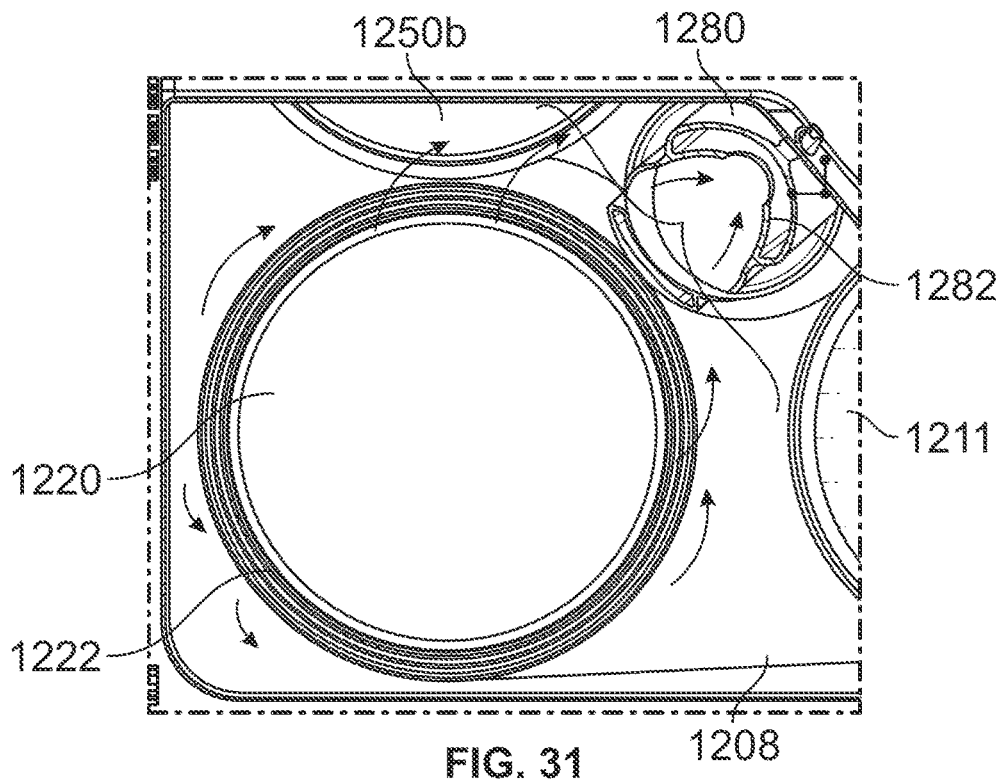
FIG. 31 is an enlarged view of a portion of the aftertreatment system of FIG. 25 showing exhaust gas emitted from an outlet of a filter entering an inlet of a decomposition tube.
Figure 32:
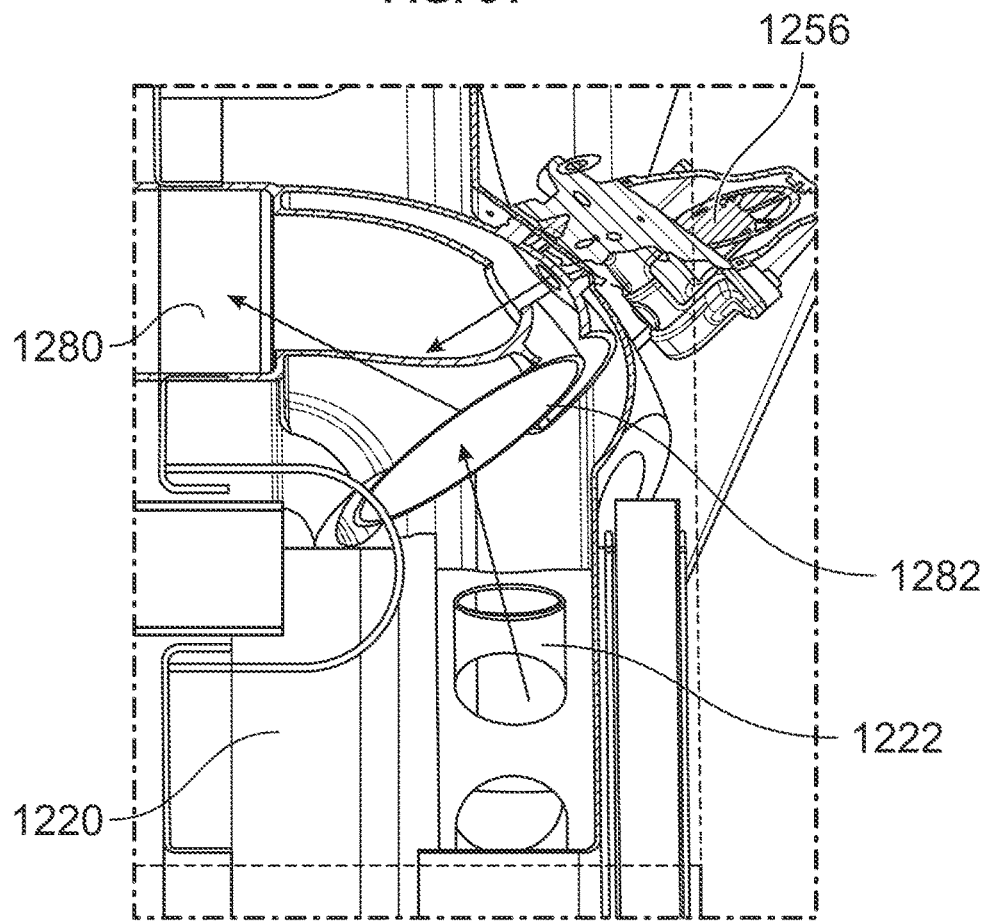
FIG. 32 is another view of the portion of the aftertreatment system shown in FIG. 30.

A decomposition tube 1280 is disposed within the housing 1270 and extends from the first internal volume 1272 to the second internal volume 1274 along an axis that is parallel to and offset from each of the first axis $A_{L1}$, the second axis $A_{L2}$, the first SCR axis $A_{SCR1}$, and the second SCR axis $A_{SCR2}$. As shown in FIGS. 30-31, an inlet of the decomposition tube 1280 is disposed in the first internal volume 1272 and configured to receive the exhaust gas from the first internal volume 1272, and communicate the exhaust gas from the first internal volume 1272 to inlets of the SCR catalysts 1250a and 1250b in the first internal volume 1272. An inlet 1282 of the decomposition tube 1280 may be located proximate to the outlet 1222 of the filters 1220. A reductant injection inlet 1255 (FIG. 30) is defined on a wall of the housing 1270 proximate to the inlet 1282 of the decomposition tube 1280 and configured to allow reductant to be injected into first internal volume 1272 proximate to the inlet 1282 of the decomposition tube 1282. A second reductant injector 1256 is mounted on the wall of the housing 1270 and configured to insert a reductant into the first internal volume 1272 via the reductant injection inlet 1255. The reductant may mix with the exhaust gas within the first internal volume before being drawn into the inlet 1282 of the decomposition tube. As shown in FIGS. 25-26, the decomposition tube 1280 is disposed proximate to a central portion of the housing 1270 such that the decomposition tube 1280 is surrounded by the first aftertreatment leg 1210', the second aftertreatment leg 1220', and the third aftertreatment leg 1250'.

The aftertreatment system 1200 further comprises a SCR inlet plenum 1284 disposed in the second internal volume 1274 and fluidly coupled to respective inlets of each of the first SCR catalysts 1250a, and the second SCR catalyst 1250b. The SCR inlet plenum 1284 is configured to redirect exhaust gas flowing therein towards respective inlets of each of the two SCR catalysts 1250a and 1250b. An outlet of the decomposition tube 1280 is fluidly coupled to the SCR inlet plenum 1284. The decomposition tube 1280 receives exhaust gas from the second internal volume 1274 and communicates the exhaust gas to the SCR inlet plenum 1284 in a third direction that is substantially opposite the second direction but in the same direction as the first direction. The SCR inlet plenum 1284 is configured to redirect exhaust gas flowing therein towards respective inlets of each of the first and second SCR catalysts 1250a and 1250b such that the exhaust gas flows in a fourth direction through the third aftertreatment leg 1250'. The fourth direction is opposite the third and the first direction, i.e., in the same direction as the second direction.

An SCR outlet plenum 1286 is disposed in the first internal volume 1272 and coupled to respective outlets of each of the SCR catalysts 1250a and 1250b. The SCR outlet plenum 1286 may define an outlet that is configured to emit exhaust gas into the second internal volume 1274. An outlet conduit 1288 is coupled to a sidewall of the housing 1270 forming the second internal volume 1274 and configured to expel the treated exhaust gas, that is communicated into the second internal volume 1274 via the SCR outlet plenum 1286, into the environment.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "about" generally mean plus or minus 10% of the stated value. For example, about 0.5 would include 0.45 and 0.55, about 10 would include 9 to 11, about 1000 would include 900 to 1100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for treating constituents of an exhaust gas, comprising:
   a housing defining a first internal volume and a second internal volume fluidly isolated from the first internal volume;
   an oxidation catalyst positioned in the first internal volume and extending along a first axis, the oxidation catalyst configured to receive at least a portion of the exhaust gas via an inlet conduit fluidly coupled to the oxidation catalyst;

a filter positioned in the first internal volume and extending along a second axis parallel to and offset from the first axis, wherein an outlet of the filter is disposed within the second internal volume and configured to emit the exhaust gas into the second internal volume;

at least one selective catalytic reduction (SCR) catalyst disposed in the second internal volume and extending along a third axis that is perpendicular to the first axis; and a decomposition tube disposed in the second internal volume in a direction parallel to the third axis, and configured to communicate the exhaust gas from the filter to the at least one SCR catalyst.

2. The aftertreatment system of claim 1, wherein the first axis is parallel to a major axis of the housing.

3. The aftertreatment system of claim 1, wherein:
the at least one SCR catalyst comprises:
　a first SCR catalyst extending along the third axis, and
　a second SCR catalyst extending along a fourth axis that is parallel to and offset from the third axis.

4. The aftertreatment system of claim 3, wherein the third axis is perpendicular to the first axis and the fourth axis is perpendicular to the second axis.

5. The aftertreatment system of claim 3, wherein the second axis is parallel to a minor axis of the housing.

6. The aftertreatment system of claim 3, wherein the decomposition tube is disposed proximate to a central portion of the housing such that the decomposition tube is positioned between the first SCR catalyst and the second SCR catalyst.

7. The aftertreatment system of claim 3, wherein:
the aftertreatment system comprises a SCR inlet plenum fluidly coupled to respective inlets of the first and second SCR catalysts;
an outlet of the decomposition tube is fluidly coupled to the SCR inlet plenum, and
the SCR inlet plenum is configured to redirect exhaust gas flowing therein towards respective inlets of the first and second SCR catalysts.

8. The aftertreatment system of claim 7, further comprising:
an SCR outlet plenum disposed in the second internal volume and coupled to respective outlets of the first and second SCR catalysts, the SCR outlet plenum defining an outlet conduit that extends through a sidewall of the housing.

9. The aftertreatment system of claim 1, wherein an inlet of the decomposition tube is oriented at an angle that is perpendicular to an axis of the decomposition tube and located proximate to the outlet of the filter.

10. The aftertreatment system of claim 9, wherein the inlet of the decomposition tube comprises:
a flat end face on which the reductant injector is mounted; and
a plurality of pores defined through a wall of the decomposition tube at the inlet of the decomposition tube and configured to allow the exhaust gas to enter the decomposition tube.

11. The aftertreatment system of claim 1, wherein the filter comprises a filter housing defining a plurality of circumferential slits.

* * * * *